US012754705B2

(12) United States Patent
Yoon et al.

(10) Patent No.: US 12,754,705 B2
(45) Date of Patent: Oct. 6, 2026

(54) DISPLAY APPARATUS FOR VEHICLES WITH ENHANCED DATA TRANSMISSION EFFICIENCY

(71) Applicant: LG Electronics Inc., Seoul (KR)

(72) Inventors: Jaegu Yoon, Seoul (KR); Hyoungkyu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/226,369

(22) Filed: Jun. 3, 2025

(65) Prior Publication Data

US 2025/0291537 A1 Sep. 18, 2025

Related U.S. Application Data

(63) Continuation of application No. 18/278,528, filed as application No. PCT/KR2022/000478 on Jan. 11, 2022, now Pat. No. 12,353,780.

(51) Int. Cl.

| | |
|---|---|
| ***G06F 3/14*** | (2006.01) |
| ***B60K 35/21*** | (2024.01) |
| ***G06F 9/455*** | (2018.01) |

(52) U.S. Cl.

CPC ............ *G06F 3/1423* (2013.01); *B60K 35/21* (2024.01); *G06F 9/45558* (2013.01); *B60K 2360/143* (2024.01); *B60K 2360/21* (2024.01); *G06F 2009/45595* (2013.01)

(58) Field of Classification Search

CPC ..................................................... G06F 3/1423

See application file for complete search history.

(56) References Cited

PUBLICATIONS

Machine Translation of JP 6523298 B published May 29, 2019 (Year: 2024).*

* cited by examiner

*Primary Examiner* — Gustavo Polo

(74) *Attorney, Agent, or Firm* — Fish & Richardson P.C.

(57) ABSTRACT

A display apparatus for a vehicle includes: a first display and a second display configured to be located in the vehicle, a first signal processing device comprising a first processor configured to perform signal processing for at least one of the first display or the second display, and a second signal processing device comprising a second processor configured to perform signal processing. The first processor is configured to execute a server virtual machine and a guest virtual machine, and the second processor is configured to execute at least one guest virtual machine.

13 Claims, 18 Drawing Sheets

FIG. 11

| | I/O resource | vCPU | Memory |
|---|---|---|---|
| VM1 | GNSS | CPU1_#1 | Memory1_#1 |
| VM2 | Touch | CPU1_#2 | Memory1_#2 |
| VM3 | NPU2 | CPU2_#1 | Memory2_#1 |
| VM4 | GPU2 | CPU2_#2 | Memory1_#3 |

DISPLAY APPARATUS FOR VEHICLES WITH ENHANCED DATA TRANSMISSION EFFICIENCY

CROSS-REFERENCE TO RELATED APPLICATIONS

This application is a continuation of U.S. application Ser. No. 18/278,528, filed on Aug. 23, 2023, which is a National Stage application under 35 U.S.C. § 371 of International Application No. PCT/KR2022/000478, filed on Jan. 11, 2022. The disclosures of the prior applications are incorporated by reference in their entirety.

TECHNICAL FIELD

The present disclosure relates to a display apparatus for vehicles, and more particularly, to a display apparatus for vehicles capable of increasing transmission efficiency for data transmission between a plurality of signal processing devices in a vehicle.

BACKGROUND

A vehicle is an apparatus that a driver moves in a desired direction. A representative example of the vehicle is a car.

In some implementations, a display apparatus for vehicles is located in the vehicle for convenience of users who use the vehicle.

For example, a display is disposed in a cluster in order to display various kinds of information. By way of further example, in order to display vehicle driving information, various displays, such as an audio video navigation (AVN) display and a rear seat entertainment display, are located in the vehicle, in addition to the cluster.

As the number of displays in the display apparatus for vehicles is increased, as described above, a plurality of signal processing devices for a plurality of displays are used.

However, when the plurality of signal processing devices for the plurality of displays are used, resources may be inefficiently managed if the signal processing devices do not share data.

A conventional electronic apparatus includes a plurality of connectors configured to allow a plurality of functional modules to be mounted thereto and a host device configured to request transmission of information from the plurality of functional modules mounted to the connectors, to determine suitability according to functions and priorities of the plurality of functional modules based on the information received from the plurality of functional modules, and to, when functional modules essentially required for a specific function are all mounted, perform control such that the functional module performs the specific function.

However, the conventional electronic apparatus has a problem in that data transmission efficiency is low, since the functional modules are connected to the host device 21 via a communication line 26 and are individually executed.

SUMMARY

The present disclosure is directed to a display apparatus for vehicles capable of increasing transmission efficiency for data transmission between a plurality of signal processing devices in a vehicle.

The present disclosure is also directed to a display apparatus for vehicles capable of efficiently managing resources in a plurality of signal processing devices for a plurality of displays in a vehicle.

The present disclosure is also directed to a display apparatus for vehicles capable of increasing transmission efficiency for data transmission between a plurality of virtual machines for a plurality of displays in a vehicle.

The present disclosure is also directed to a display apparatus for vehicles capable of performing efficient resource management or load distribution between a plurality of signal processing devices.

According to one aspect of the subject matter described in this application, a display apparatus for a vehicle can include a first display and a second display configured to be located in the vehicle, a first signal processing device comprising a first processor configured to perform signal processing for at least one of the first display or the second display, and a second signal processing device comprising a second processor configured to perform signal processing. The first processor can be configured to execute a server virtual machine and a guest virtual machine, and the second processor can be configured to execute at least one guest virtual machine.

Implementations according to this aspect can include one or more of the following features. For example, the display apparatus can further include a third display configured to be located in the vehicle, where the second processor is configured to perform signal processing for the third display.

In some implementations, the second processor can be configured to, based on the server virtual machine being executed by the first processor, execute the at least one guest virtual machine. In some implementations, the first signal processing device and the second signal processing device can be configured to transmit or receive data using a coupled shared memory.

In some examples, the server virtual machine can be configured to control the guest virtual machine executed in the first processor and the guest virtual machine executed in the second processor. In some examples, based on high-speed interfaces not being supported between the first signal processing device and the second signal processing device, (i) the first signal processing device can be configured to operate as a master signal processing device and (ii) the second signal processing device can be configured to operate as a slave signal processing device.

In some implementations, based on high-speed interfaces being supported between the first signal processing device and the second signal processing device and non-uniform memory access not being supported, (i) the first signal processing device can be configured to execute a first hypervisor and (ii) the second signal processing device can be configured to execute a second hypervisor. In some implementations, based on (i) high-speed interfaces being supported between the first signal processing device and the second signal processing device, (ii) non-uniform memory access being supported, and (iii) spanning being supported, the first signal processing device and the second signal processing device can be configured to execute a same hypervisor.

In some examples, based on high-speed interfaces being supported between the first signal processing device and the second signal processing device, non-uniform memory access being supported, and spanning not being supported, (i) the first signal processing device can be configured to execute a first hypervisor and (ii) the second signal processing device can be configured to execute a second hypervisor. In some examples, the server virtual machine can be configured to control resource management for the guest virtual machine executed in the first processor and the guest virtual machine executed in the second processor.

In some implementations, the server virtual machine can be configured to change resource allocation for the first processor or the second processor based on usage rates of the first processor and the second processor, a memory bandwidth, and a cache missing rate. In some implementations, the first processor or the second processor can be configured to control a local virtual machine and a remote virtual machine based on a position of input and output of data.

In some examples, the server virtual machine can be configured to receive and process wheel speed sensor data, position information data, camera image data, or touch input data of the vehicle, and transmit the wheel speed sensor data, the position information data, the camera image data, or the touch input data of the vehicle to a client interface in the guest virtual machine executed in the first processor through a server interface. In some examples, the server virtual machine can be configured to write wheel speed sensor data, position information data, camera image data, or touch input data of the vehicle in a first shared memory in the first signal processing device, and the guest virtual machine executed in the first signal processing device can be configured to read the wheel speed sensor data, the position information data, the camera image data, or the touch input data of the vehicle written in the first shared memory.

In some implementations, the server virtual machine can be configured to receive and process wheel speed sensor data, position information data, camera image data, or touch input data of the vehicle, and transmit the wheel speed sensor data, the position information data, the camera image data, or the touch input data of the vehicle to the guest virtual machine executed in the second signal processing device through high-speed interfaces between the first signal processing device and the second signal processing device. In some implementations, the server virtual machine can be configured to write wheel speed sensor data, position information data, camera image data, or touch input data of the vehicle in a second shared memory in the second signal processing device, and the guest virtual machine executed in the second signal processing device can be configured to read the wheel speed sensor data, the position information data, the camera image data, or the touch input data of the vehicle written in the second shared memory.

In some examples, the server virtual machine can be configured to write wheel speed sensor data, position information data, camera image data, or touch input data of the vehicle in a first shared memory in the first signal processing device, and the guest virtual machine executed in the first signal processing device can be configured to, based on the first shared memory in the first signal processing device and a second shared memory in the second signal processing device being coupled to each other, read the wheel speed sensor data, the position information data, the camera image data, or the touch input data of the vehicle in the second shared memory coupled to the first shared memory.

In some implementations, the server virtual machine can be configured to write camera data in at least one of a first shared memory in the first signal processing device or a second shared memory in the second signal processing device, the guest virtual machine executed in the first processor can be configured to receive and process camera data written in the first shared memory and write the processed data in the first shared memory, and the at least one guest virtual machine executed in the second processor can be configured to receive and process camera data written in the second shared memory and write the processed data in the second shared memory.

In some implementations, the server virtual machine can be configured to write camera data in a first shared memory in the first signal processing device, the guest virtual machine executed in the first processor can be configured to receive and process the camera data written in the first shared memory and write the processed data in the first shared memory, and the second processor in the second signal processing device can be configured to perform augmented reality processing on the camera data through neural network processing and write the augmented reality processed data in the first shared memory or a second shared memory.

According to another aspect of the subject matter described in this application, a display apparatus for a vehicle can include a first display and a second display that are configured to be located in the vehicle, a first signal processing device comprising a first processor configured to perform signal processing for at least one of the first display or the second display, and a second signal processing device comprising a second processor configured to perform signal processing. The first signal processing device and the second signal processing device can be configured to perform data transmission with each other, and the first signal processing device and the second signal processing device can be configured to execute a same hypervisor.

BRIEF DESCRIPTION OF THE DRAWINGS

FIGS. 9 to 15 are diagrams referred to in the description of FIG. 8.

DETAILED DESCRIPTION

Figure 1A:
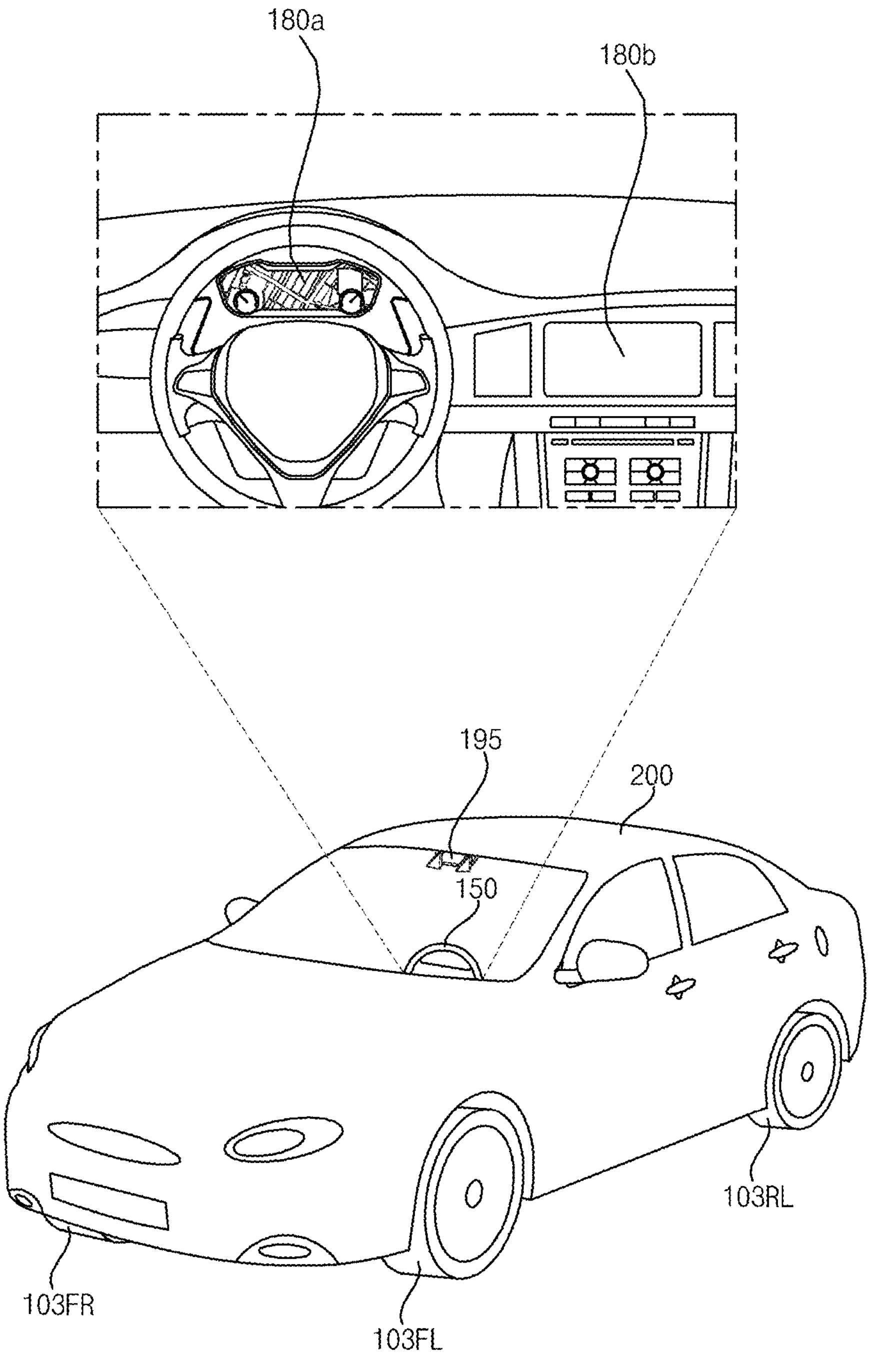
FIG. 1A is a diagram illustrating an example of the exterior and interior of a vehicle.

FIG. 1A is a diagram illustrating an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

In some implementations, the vehicle 200 can be provided with a camera 195 configured to acquire an image of the front of the vehicle.

In some implementations, the vehicle 200 can be further provided therein with a plurality of displays 180*a* and 180*b* configured to display images and information.

In FIG. 1A, a cluster display 180*a* and an audio video navigation (AVN) display 180*b* are illustrated as the plurality of displays 180*a* and 180*b*. In addition, a head up display (HUD) can also be used.

In some implementations, the audio video navigation (AVN) display **180*b*** can also be called a center information display.

For example, the display apparatus 100 for vehicles can include a plurality of displays **180*a* and 180*b*** to divide data processing.

In some implementations, the vehicle 200 described in this specification can be a concept including all of a vehicle having an engine as a power source, a hybrid vehicle having an engine and an electric motor as a power source, and an electric vehicle having an electric motor as a power source.

Figure 1B:
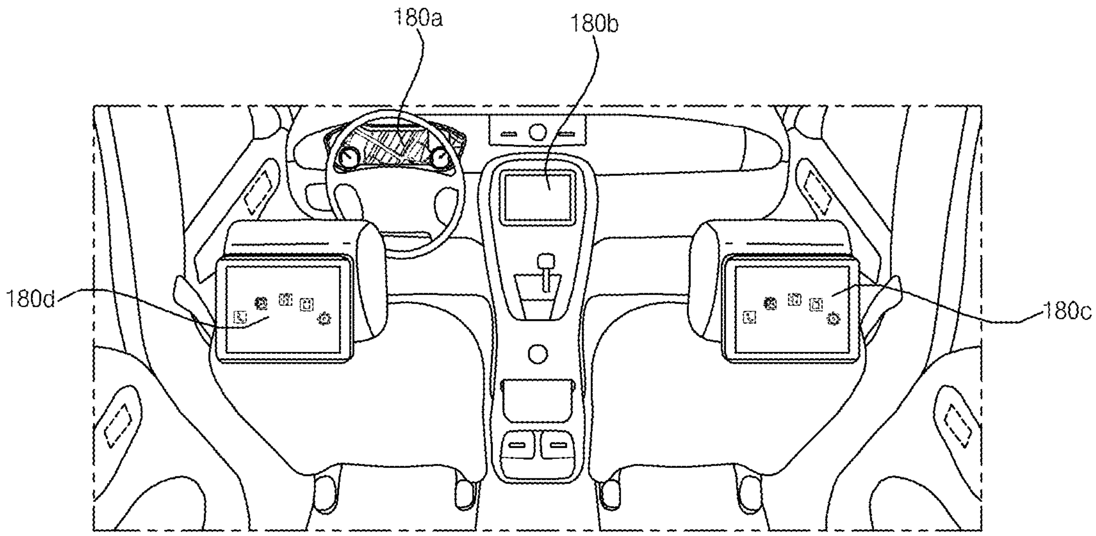
FIG. 1B is a diagram illustrating another example of the interior of the vehicle.

FIG. 1B is a diagram illustrating another example of the interior of the vehicle.

Referring to the figure, a cluster display **180*a*, an audio video navigation (AVN) display 180*b*, rear seat entertainment displays 180*c* and 180*d***, and a rear-view mirror display can be located in the vehicle.

Figure 2:
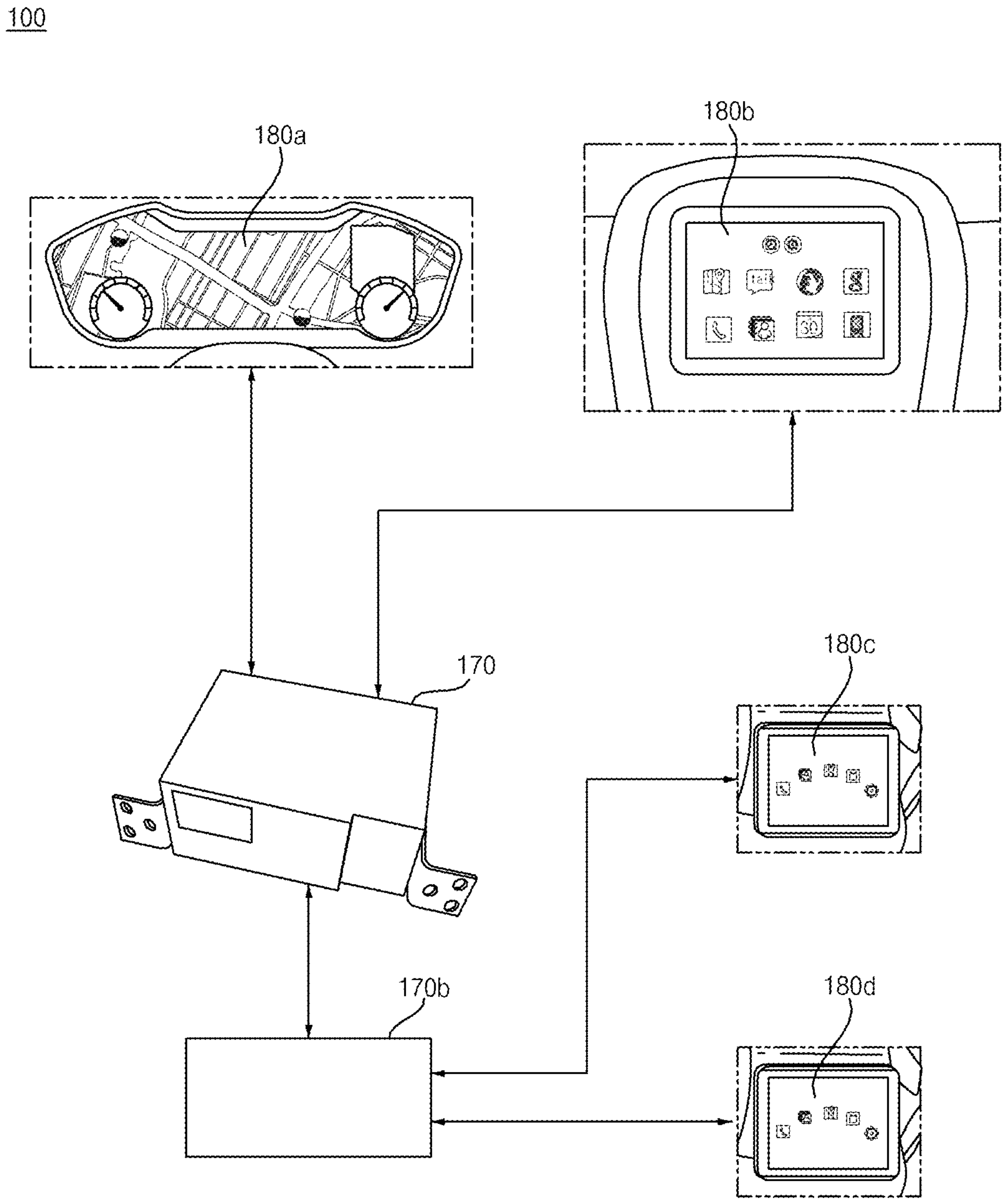
FIG. 2 is a diagram illustrating an example of an external appearance of a display apparatus for vehicles.

FIG. 2 is a diagram illustrating an example of the external appearance of a display apparatus for vehicles.

The display apparatus 100 for vehicles can include a plurality of displays **180*a* and 180*b*, a signal processing device 170 configured to perform signal processing to display images and information on the plurality of displays 180*a* and 180*b*, at least one display 180*c* and 180*d*, and a second signal processing device 170*b* configured to perform signal processing in order to display images and information on the at least one display 180*c* and 180*d***.

The signal processing device 170 and the second signal processing device **170*b*** can be spaced apart from each other.

In some implementations, the second signal processing device **170*b* can be operated based on a different operating system (OS) from the signal processing device 170**.

The first display **180*a*, which is one of the plurality of displays 180*a* and 180*b*, can be a cluster display 180*a* configured to display a driving state and operation information, and the second display 180*b* can be an audio video navigation (AVN) display 180*b*** configured to display vehicle driving information, a navigation map, various kinds of entertainment information, or an image.

In the at least one display **180*c* and 180*d*, the third display 180*c* can be a right rear seat entertainment display of the vehicle, and the fourth display 180*d*** can be a left rear seat entertainment display of the vehicle.

The at least one display **180*c* and 180*d*** can display driving state information, simple navigation information, various kinds of entertainment information, or an image.

The signal processing device 170 can have a processor 175 provided therein, and a server virtual machine 520 and first and second guest virtual machines 530 and 540 can be executed by a hypervisor 505 in the processor 175.

The server virtual machine 520 can correspond to a server virtual machine, and the first and second guest virtual machines can correspond to guest virtual machines.

Consequently, data communication can be performed between the server virtual machine 520 and the first or second guest virtual machine 530 or 540 according to a server interface and a client interface.

The first guest virtual machine 530 can be operated for the first display **180*a*, and the second guest virtual machine 540 can be operated for the second display 180*b***.

In some implementations, the server virtual machine 520 in the processor 175 may share at least some of data with the first guest virtual machine 530 and the second guest virtual machine 540 for divided processing of data.

In some implementations, the server virtual machine 520 in the processor 175 may receive and process wheel speed sensor data of the vehicle, and can transmit the processed wheel speed sensor data to at least one of the first guest virtual machine 530 or the second guest virtual machine 540, or the second signal processing device **170*b***. Consequently, at least one virtual machine or the second signal processing device can share the wheel speed sensor data of the vehicle.

In some implementations, the server virtual machine 520 in the processor 175 writes some of data in a first shared memory **508*a* so as to be transmitted to the first guest virtual machine 530, and writes some other of data in the first shared memory 508*a* so as to be transmitted to the second guest virtual machine 540. The first guest virtual machine 530 and the second guest virtual machine 540** can process the received data, and can be configured to write the processed data in a second shared memory. Consequently, the plurality of signal processing devices in the vehicle can efficiently perform data processing. For example, the plurality of signal processing devices can more efficiently perform data processing by sharing data in a shared memory.

In some implementations, the server virtual machine 520 in the processor 175 can be configured to set a shared memory 508 based on the hypervisor 505 for transmission of the same data to the first guest virtual machine 530 and the second guest virtual machine 540. Consequently, the first display **180*a* and the second display 180*b*** in the vehicle can display the same information or the same images in a synchronized state.

The signal processing device 170 can have the processor 175 therein, and can execute the server virtual machine 520 and the first and second guest virtual machines 530 and 540 on the hypervisor 505 in the processor 175.

The server virtual machine 520 can correspond to a server virtual machine, and the first and second guest virtual machines can correspond to guest virtual machines.

Consequently, data communication can be performed between the server virtual machine 520 and the first or second guest virtual machine 530 or 540 according to the server interface and the client interface.

In some implementations, the second signal processing device **170*b* can have a second processor 175*b* therein, and may execute a server virtual machine VIMc and a guest virtual machine VIMd on a hypervisor 505*b* in the second processor 175*b***.

In some implementations, some of the plurality of displays **180*a* to 180*d*** can be operated based on a Linux Operating System (OS), and others can be operated based on a Web Operating System (OS).

The signal processing device 170 and the second signal processing device **170*b* can divide and process data for the displays 180*a* to 180*d*** configured to be operated under various operating systems.

In some implementations, the signal processing device 170 and the second signal processing device **170*b* can be configured to also display the same information or the same images in a synchronized state in the displays 180*a* to 180*d*** configured to be operated under various operating systems.

In some implementations, the signal processing device 170 and the second signal processing device **170*b* can share at least some of data for divided processing of the data. Consequently, the plurality of signal processing devices 170 and 170*b* for the plurality of displays in the vehicle can divide and process data. In addition, the plurality of signal processing devices 170 and 170*b* can efficiently manage resources. For example, the plurality of signal processing devices 170 and 170*b*** can more efficiently manage resources by dividing and processing data among themselves.

Figure 3:
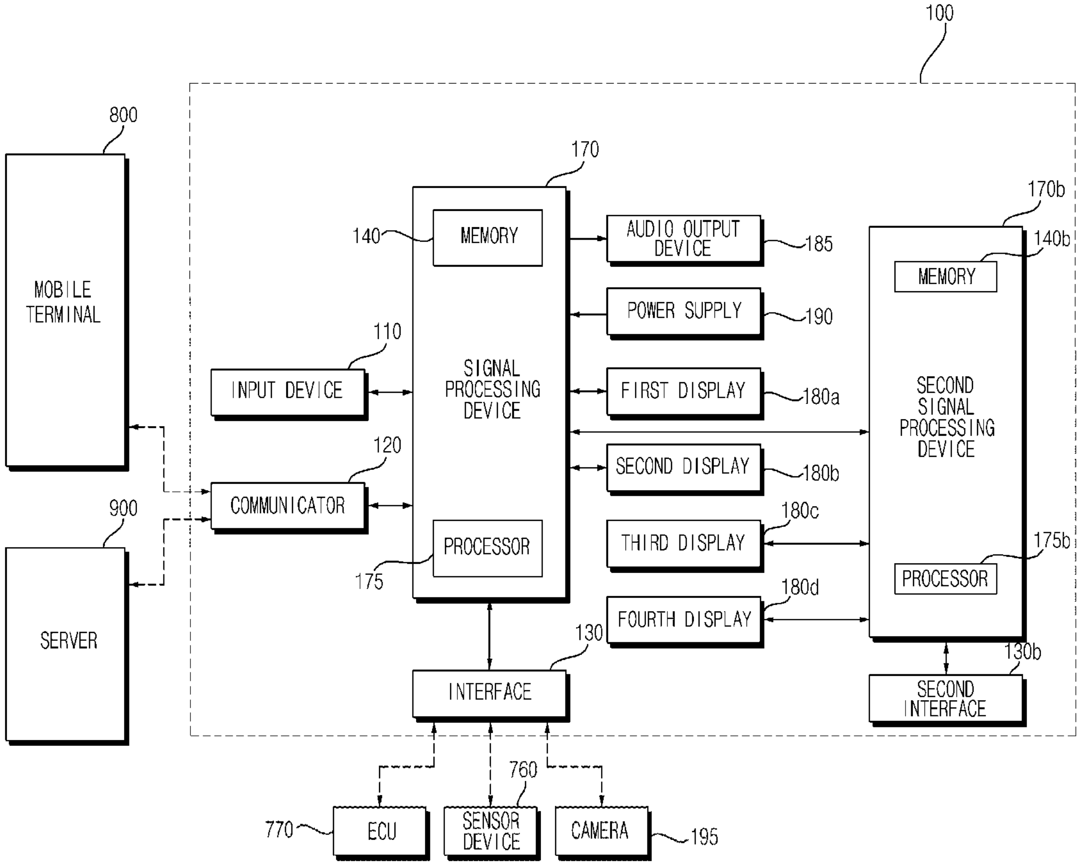
FIG. 3 is a diagram illustrating an example of an internal block diagram of the display apparatus for vehicles of FIG. 2.

FIG. 3 is a diagram illustrating an example of an internal block diagram of the display apparatus for vehicles.

Referring to the figure, the display apparatus 100 for vehicles can include an input device 110, a communicator 120, an interface 130, a second interface 130*b*, a signal processing device 170, a second signal processing device 170*b*, a plurality of displays 180*a* to 180*d*, an audio output device 185, and a power supply 190.

The input device 110 can include a physical button or pad for button input or touch input.

In some implementations, the input device 110 can include a microphone for user voice input.

The communicator 120 can wirelessly exchange data with a mobile terminal 800 or a server 900.

In particular, the communicator 120 can wirelessly exchange data with a mobile terminal of a vehicle driver. Any of various data communication schemes, such as Bluetooth, Wi-Fi, WIFI Direct, and APIX, can be used as a wireless data communication scheme.

The communicator 120 can receive weather information and road traffic situation information, such as transport protocol expert group (TPEG) information, from the mobile terminal 800 or the server 900. For example, the communicator 120 can include a mobile communication module.

The interface 130 can receive sensor information from an electronic control unit (ECU) 770 or a sensor device 760, and can transmit the received information to the signal processing device 170.

The second interface 130*b* can receive sensor information from the electronic control unit (ECU) 770 or the sensor device 760, and can transmit the received information to the second signal processing device 170*b*.

In some implementations, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. In some implementations, the position module can include a GPS module configured to receive GPS information.

In some implementations, the interface 130 can receive front-of-vehicle image data, side-of-vehicle image data, rear-of-vehicle image data, and obstacle-around-vehicle distance information from a camera 195 or lidar, and can transmit the received information to the signal processing device 170.

The memory 140 can store various data necessary for overall operation of the display apparatus 100 for vehicles, such as programs for processing or control of the signal processing device 170.

For example, the memory 140 can store data about the hypervisor, the server virtual machine, and the first and second guest virtual machines executed by the hypervisor in the processor 175.

In some implementations, the memory 140 can be provided in the signal processing device 170. However, the present disclosure is not limited thereto, and the memory 140 can be disposed outside the signal processing device 170.

The audio output device 185 can convert an electrical signal from the signal processing device 170 into an audio signal, and can output the audio signal. For example, the audio output device 185 can include a speaker.

The power supply 190 can supply power necessary to operate components under control of the signal processing device 170. In particular, the power supply 190 can receive power from a battery in the vehicle.

The signal processing device 170 can control overall operation of each device in the display apparatus 100 for vehicles.

For example, the signal processing device 170 can include a processor 175 configured to perform signal processing for at least one of the first display 180*a* or the second display 180*b* and a memory 140.

The processor 175 can execute the server virtual machine 520 and the first and second guest virtual machines 530 and 540 on the hypervisor 505 (see FIG. 5) in the processor 175.

Among the server virtual machine 520 and the first and second guest virtual machines 530 and 540 (see FIG. 5), the server virtual machine 520 can be called a server virtual machine, and the first and second guest virtual machines 530 and 540 can be called guest virtual machines.

The first guest virtual machine 530 can be operated for the first display 180*a*, and the second guest virtual machine 540 can be operated for the second display 180*b*.

For example, the server virtual machine 520 in the processor 175 can receive, process, and output vehicle sensor data, position information data, camera image data, audio data, or touch input data. Data processed only by a legacy virtual machine and data processed by the server virtual machine 520 can be distinguished from each other, whereby data processing may be efficiently performed. In particular, the server virtual machine 520 can process most of the data, whereby 1:N data sharing can be achieved. For example, the server virtual machine 520 can more efficiently process data by processing most of the data and the remaining data are processed by sharing the data with other virtual machines.

As another example, the server virtual machine 520 can directly receive and process CAN communication data, audio data, radio data, USB data, and wireless communication data for the first and second guest virtual machines 530 and 540.

The server virtual machine 520 can transmit the processed data to the first and second guest virtual machines 530 and 540.

Consequently, only the server virtual machine 520, among the server virtual machine 520 and the first and second guest virtual machines 530 and 540, can receive communication data and external input data, and can perform signal processing, whereby load in signal processing by the other virtual machines can be reduced and 1:N data communication can be achieved, and therefore synchronization at the time of data sharing can be achieved.

In some implementations, the server virtual machine 520 in the processor 175 writes some of data in the first shared memory 508*a* so as to be transmitted to the first guest virtual machine 530, and writes some other of data in the first shared memory 508*a* so as to be transmitted to the second guest virtual machine 540. The first guest virtual machine 530 and the second guest virtual machine 540 can process the received data, and can be configured to write the processed data in the second shared memory. Consequently, data processing can be efficiently performed between the plurality of signal processing devices in the vehicle.

In some implementations, data can be any one of image data, audio data, navigation data, and voice recognition data.

In some implementations, the server virtual machine 520 can process some other of data, and can be configured to write the processed data in the second shared memory. For example, the server virtual machine 520 can perform data processing in addition to the first guest virtual machine 530 and the second guest virtual machine 540.

In some implementations, the server virtual machine 520 can create command queues for distributed processing of data in the first guest virtual machine 530 and the second guest virtual machine 540. Consequently, the plurality of virtual machines can divide and process data.

In some implementations, in response to the first guest virtual machine 530 and the second guest virtual machine 540 sharing the same data, the server virtual machine 520 in the processor 175 can create one command queue. Consequently, the same data can be synchronized and shared.

In some implementations, the server virtual machine 520 can create command queues corresponding to the number of virtual machines for distributed processing of data.

In some implementations, the server virtual machine 520 can be configured to transmit write at least some of data to at least one of the first guest virtual machine 530 or the second guest virtual machine 540, or the second signal processing device 170*b* for distributed processing of data.

For example, the server virtual machine 520 can allocate the first shared memory 508*a* for transmitting at least some of data to at least one of the first guest virtual machine 530 or the second guest virtual machine 540, or the second signal processing device 170*b*, and image data processed by the first guest virtual machine 530 or the second guest virtual machine 540 can be written in the second shared memory.

In some implementations, the server virtual machine 520 can be configured to write data in the shared memory 508, whereby the first guest virtual machine 530 and the second guest virtual machine 540 share the same data.

For example, the server virtual machine 520 can be configured to write radio data or wireless communication data in the shared memory 508, whereby the first guest virtual machine 530 and the second guest virtual machine 540 share the same data. Consequently, 1:N data sharing can be achieved.

In some implementations, the server virtual machine 520 can process most of the data, whereby 1:N data sharing can be achieved.

In some implementations, the server virtual machine 520 in the processor 175 can be configured to set the shared memory 508 based on the hypervisor 505 to transmit the same data to the first guest virtual machine 530 and the second guest virtual machine 540.

For example, the server virtual machine 520 in the processor 175 can transmit the same data to the first guest virtual machine 530 and the second guest virtual machine 540 in a synchronized state using the shared memory 508 based on the hypervisor 505. Consequently, the plurality of displays 180*a* and 180*b* in the vehicle can display the same images in a synchronized state.

In some implementations, the signal processing device 170 can process various signals, such as an audio signal, an image signal, and a data signal. For example, the signal processing device 170 can be implemented in the form of a system on chip (SOC).

The second signal processing device 170*b* can perform signal processing for the displays 180*c* and 180*d* for vehicles, and can include a second processor 175*b* and a second memory 140*b*.

The second processor 175*b* can execute the server virtual machine VIMc (FIG. 9) and the guest virtual machine VIMd (FIG. 9) and 540*b* on the hypervisor 505*b* (FIG. 9) in the second processor 175*b*.

For example, the server virtual machine VIMc in the second processor 175*b* can receive, process, and output vehicle sensor data, position information data, camera image data, audio data, or touch input data from the server virtual machine 520 in the processor 175 in the signal processing device 170.

As another example, the server virtual machine VIMc can receive and process CAN communication data, audio data, radio data, USB data, and wireless communication data from the server virtual machine 520 in the processor 175 in the signal processing device 170 for the guest virtual machine VIMd.

The server virtual machine VIMc can transmit the processed data to the guest virtual machine VIMd.

Consequently, only the server virtual machine VIMc, which is one of the server virtual machine VIMc and the guest virtual machine VIMd, can receive communication data and external input data, and can perform signal processing, whereby signal processing load of the guest virtual machine VIMd can be reduced and 1:N data communication can be achieved, and therefore synchronization at the time of data sharing can be achieved.

In some implementations, the server virtual machine VIMc can write some of data in the shared memory so as to be transmitted to the guest virtual machine VIMd, and the guest virtual machine VIMd can process the received data, and can be configured to write the processed data in the shared memory. Consequently, the plurality of signal processing devices for the plurality of displays in the vehicle can divide and process data.

In some implementations, data can be any one of image data, audio data, navigation data, and voice recognition data.

In some implementations, the server virtual machine VIMc can create command queues for distributed processing of data in the plurality of virtual machines. Consequently, the plurality of virtual machines can divide and process data.

In some implementations, in response to plurality of virtual machines sharing the same data, the server virtual machine VIMc in the second processor 175*b* can create one command queue. Consequently, the same data can be synchronized and shared.

In some implementations, the server virtual machine VIMc can create command queues corresponding to the number of virtual machines for distributed processing of data.

In some implementations, the server virtual machine VIMc can be configured to transmit write at least some of data to the guest virtual machine VIMd for distributed processing of data.

For example, the server virtual machine VIMc can allocate the shared memory for transmitting at least some of data to the guest virtual machine VIMd, and image data processed by the guest virtual machine VIMd can be written in the shared memory.

In some implementations, the server virtual machine VIMc can be configured to write data in the shared memory, whereby the guest virtual machine VIMd shares the same data.

For example, the server virtual machine VIMc can be configured to write radio data or wireless communication data in the shared memory, whereby the guest virtual machine VIMd shares the same data. Consequently, 1:N data sharing can be achieved.

In some implementations, the server virtual machine VIMc can process most of the data, whereby 1:N data sharing can be achieved.

In some implementations, the server virtual machine VIMc in the second processor 175*b* can be configured to set the shared memory based on the hypervisor 505*b* to transmit the same data to the guest virtual machine VIMd.

For example, the server virtual machine VIMc in the second processor 175*b* can transmit the same data to the guest virtual machine VIMd in a synchronized state using the shared memory based on the hypervisor 505*b*. Consequently, the plurality of displays 180*c* and 180*d* in the vehicle can display the same images in a synchronized state.

In some implementations, the second signal processing device 170*b* can process various signals, such as an audio signal, an image signal, and a data signal. For example, the second signal processing device 170*b* can be implemented in the form of a system on chip (SOC).

Figure 4:
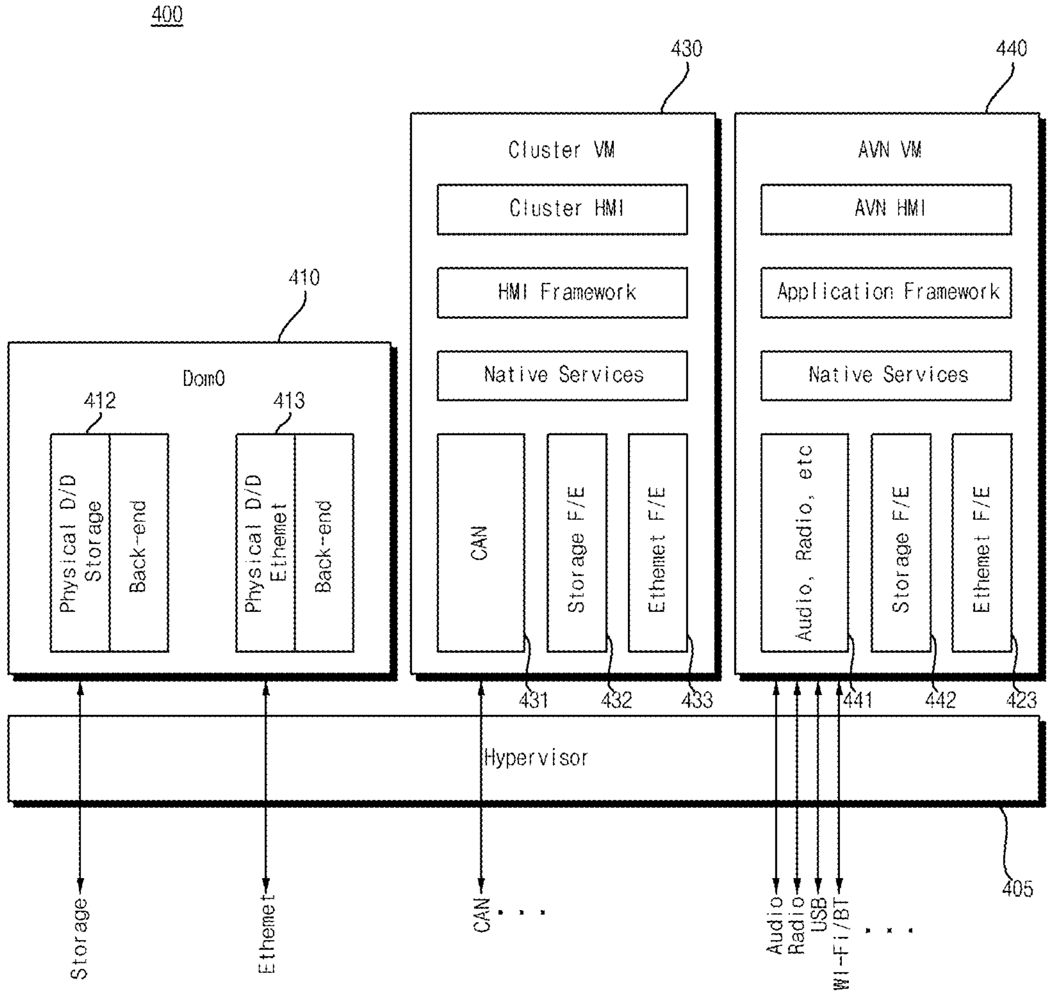
FIG. 4 is a diagram illustrating an example of a system executed in a signal processing device.

FIG. 4 is a diagram illustrating an example of a system executed in a signal processing device.

Referring to the figure, FIG. 4 depicts that virtual machines are used for the cluster display 180*a* and the AVN display 180*b*.

The system 400 executed in the signal processing device of FIG. 4 illustrates that a cluster virtual machine 430 and an AVN virtual machine 440 are executed on a hypervisor 405 in the processor 175 in the signal processing device 170.

In some implementations, the system 400 executed in the signal processing device of FIG. 4 illustrates that a legacy virtual machine 410 is also executed on the hypervisor 405 in the processor 175.

The legacy virtual machine 410 can include an interface 412 for data communication with the memory 140 and an interface 413 for Ethernet communication.

In some implementations, the cluster virtual machine 430 can include an interface 431 for CAN communication, an interface 432 for communication with the interface 412 of the legacy virtual machine 410, and an interface 433 for communication with the interface 413 of the legacy virtual machine 410.

In some implementations, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there may be a disadvantage in that CAN communication data are input and output only in the cluster virtual machine 430, whereby the CAN communication data cannot be utilized in the AVN virtual machine 440.

Also, in the system 400 of FIG. 4, there may be a disadvantage in that audio data, radio data, USB data, and wireless communication data are input and output only in the AVN virtual machine 440, whereby these data cannot be utilized in the cluster virtual machine 430.

Further, there may be a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. For example, virtual machines can be classified into a server virtual machine and guest virtual machines for inputting and outputting various memory data and communication data not in the guest virtual machines but in the server virtual machine. This will be described with reference to FIG. 5 and subsequent figures.

Figure 5:
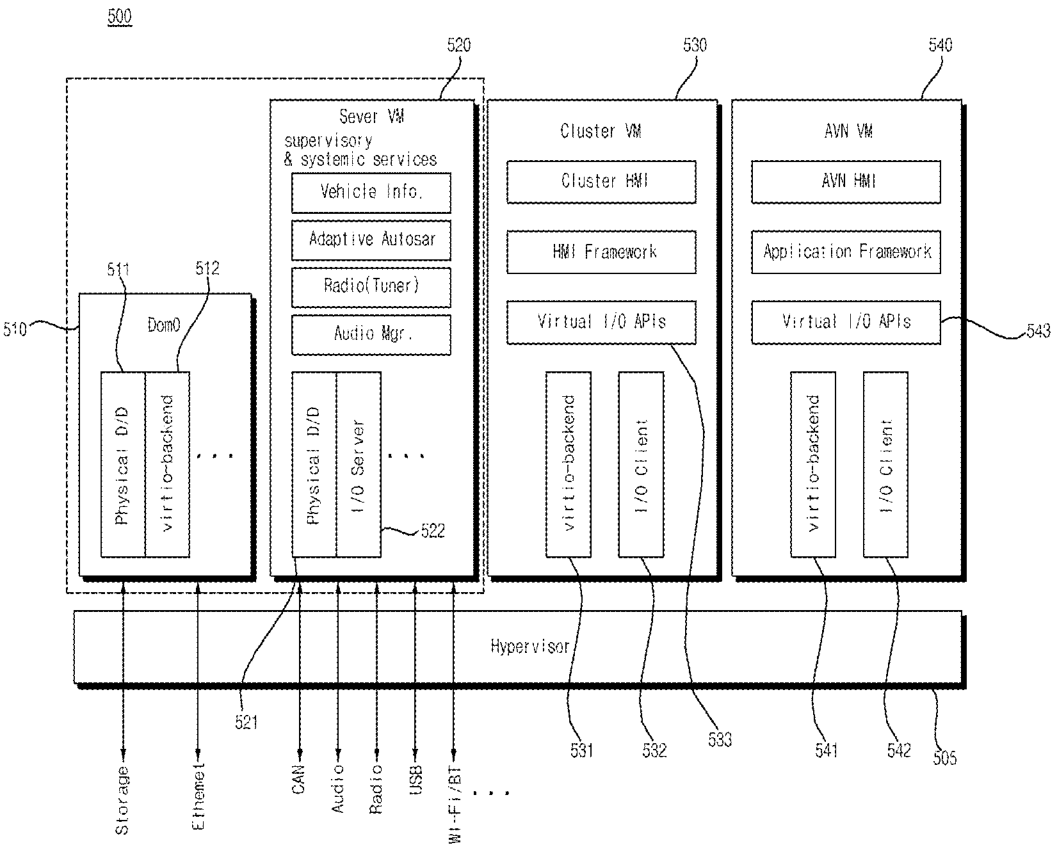
FIG. 5 is a diagram illustrating another example of a system executed in a signal processing device.

FIG. 5 is a diagram illustrating another example of a system executed in a signal processing device.

Referring to the figure, the system 500 of FIG. 5 depicts that the server virtual machine 520, the first guest virtual machine 530, and the second guest virtual machine 540 can be executed on the hypervisor 505 in the processor 175 of the signal processing device 170.

The first guest virtual machine 530 can be a virtual machine for the cluster display 180*a*, and the second guest virtual machine 540 can be a virtual machine for the AVN display 180*b*.

For example, the first guest virtual machine 530 and the second guest virtual machine 540 can be operated for image rendering of the cluster display 180*a* and the AVN display 180*b*, respectively.

In some implementations, the system 500 executed in the signal processing device 170 of FIG. 5 illustrates that a legacy virtual machine 510 is also executed on the hypervisor 505 in the processor 175.

The legacy virtual machine 510 can include an interface 511 for data communication with the memory 140 and Ethernet communication.

In some implementations, the legacy virtual machine 510 can further include a virtual input and output device backend (virtio-backend) interface 512 for data communication with the first and second guest virtual machines 530 and 540.

The server virtual machine 520 can include an interface 521 for input and output of audio data, radio data, USB data, and wireless communication data and an input and output server interface 522 for data communication with the guest virtual machines.

For example, the server virtual machine 520 can provide inputs/outputs (I/O) difficult to virtualize with standard virtualization technology (VirtIO) to a plurality of guest virtual machines, such as the first and second guest virtual machines 530 and 540.

In some implementations, the server virtual machine 520 can control radio data and audio data at a supervisor level, and can provide the data to a plurality of guest virtual machines, such as the first and second guest virtual machines 530 and 540.

In some implementations, the server virtual machine 520 can process vehicle data, sensor data, and surroundings-of-vehicle information, and may provide the processed data or information to a plurality of guest virtual machines, such as the first and second guest virtual machines 530 and 540.

In some implementations, the server virtual machine 520 can provide supervisory services, such as processing of vehicle data and audio routing management.

In some implementations, the first guest virtual machine 530 can include an input and output client interface 532 for data communication with the server virtual machine 520 and APIs 533 configured to control the input and output client interface 532.

In addition, the first guest virtual machine 530 can include a virtio-backend interface 531 for data communication with the legacy virtual machine 510.

The first guest virtual machine 530 can receive memory data by communication with the memory 140 and Ethernet data by Ethernet communication from the virtio-backend interface 512 of the legacy virtual machine 510 through the virtio-backend interface.

In some implementations, the second guest virtual machine 540 can include an input and output client interface 542 for data communication with the server virtual machine 520 and APIs 543 configured to control the input and output client interface 542.

In addition, the second guest virtual machine 540 can include a virtio-backend interface 541 for data communication with the legacy virtual machine 510.

The second guest virtual machine 540 can receive memory data by communication with the memory 140 and Ethernet data by Ethernet communication from the virtio-backend interface 512 of the legacy virtual machine 510 through the virtio-backend interface.

In some implementations, the legacy virtual machine 510 can be provided in the server virtual machine 520.

In the system 500, CAN communication data are input and output only in the server virtual machine 520, but can be provided to a plurality of guest virtual machines, such as the first and second guest virtual machines 530 and 540, through data processing in the server virtual machine 520. Consequently, 1:N data communication by processing of the server virtual machine 520 can be achieved.

In addition, in the system 500 of FIG. 5, audio data, radio data, USB data, and wireless communication data are input and output only in the server virtual machine 520, but can be provided to a plurality of guest virtual machines, such as the first and second guest virtual machines 530 and 540, through data processing in the server virtual machine 520. Consequently, 1:N data communication by processing of the server virtual machine 520 can be achieved.

In some implementations, in the system 500 of FIG. 5, the first and second guest virtual machines 530 and 540 can be operated based on different operating systems.

For example, the first guest virtual machine 530 can be operated based on a Linux OS, and the second guest virtual machine 540 can be operated based on a Web OS.

In the server virtual machine 520, the shared memory 508 based on the hypervisor 505 can be set for data sharing, even though the first and second guest virtual machines 530 and 540 are operated based on different operating systems. Even though the first and second guest virtual machines 530 and 540 are operated based on different operating systems, therefore, the same data or the same images can be shared in a synchronized state. Eventually, the plurality of displays 180*a* and 180*b* can display the same data or the same images in a synchronized state.

Figure 6:
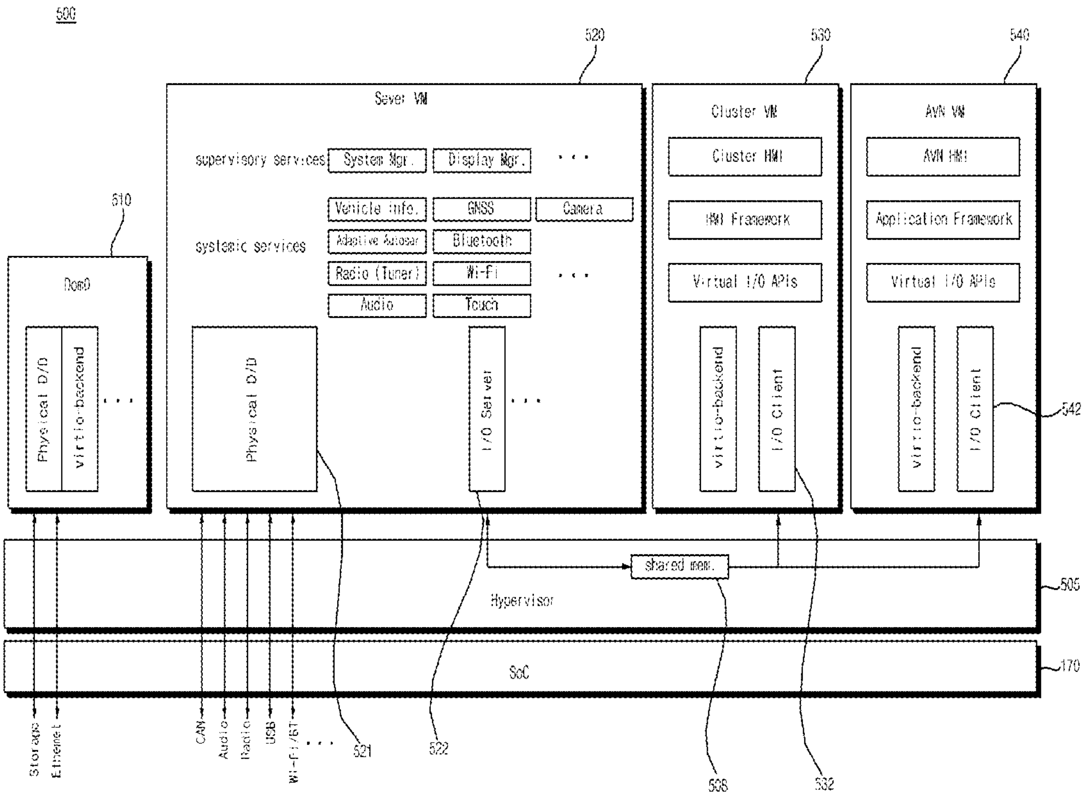
FIG. 6 is a diagram describing an operation of the system executed in the signal processing device.

FIG. 6 is a diagram describing an operation of the system executed in the signal processing device.

Referring to the figure, the processor 175 in the signal processing device 170 can execute the server virtual machine 520 and the first and second guest virtual machines 530 and 540 on the hypervisor 505 in the processor 175, and the server virtual machine 520 in the processor 175 can be configured to set the shared memory 508 based on the hypervisor 505 for transmission of the same data to the first and second guest virtual machines 530 and 540.

For example, the same image data may be illustrated as the same data. Consequently, the plurality of displays 180*a* and 180*b* in the vehicle can display the same images in a synchronized state.

In some implementations, in the system 500 of FIG. 6, the processor 175 in the signal processing device 170 executes the server virtual machine 520 and the first and second guest virtual machines 530 and 540 on the hypervisor 505 in the processor 175, and the server virtual machine 520 in the processor 175 can transmit the same data to the first and second guest virtual machines 530 and 540 in a synchronized state using the shared memory 508 based on the hypervisor 505.

For example, CAN communication data, audio data, radio data, USB data, wireless communication data, position information data, or touch data can be illustrated as the same data. Consequently, the plurality of displays 180*a* and 180*b* in the vehicle can display the same data in a synchronized state.

In some implementations, the legacy virtual machine 510 can transmit memory data from the memory 140 and Ethernet data by Ethernet communication to the first and second guest virtual machines 530 and 540 in a synchronized state using the shared memory 508 based on the hypervisor 505. For example, it is possible to perform 1:N data communication with respect to the memory data or the Ethernet data, whereby it is possible to transmit the same data in a synchronized state.

Figure 7A:
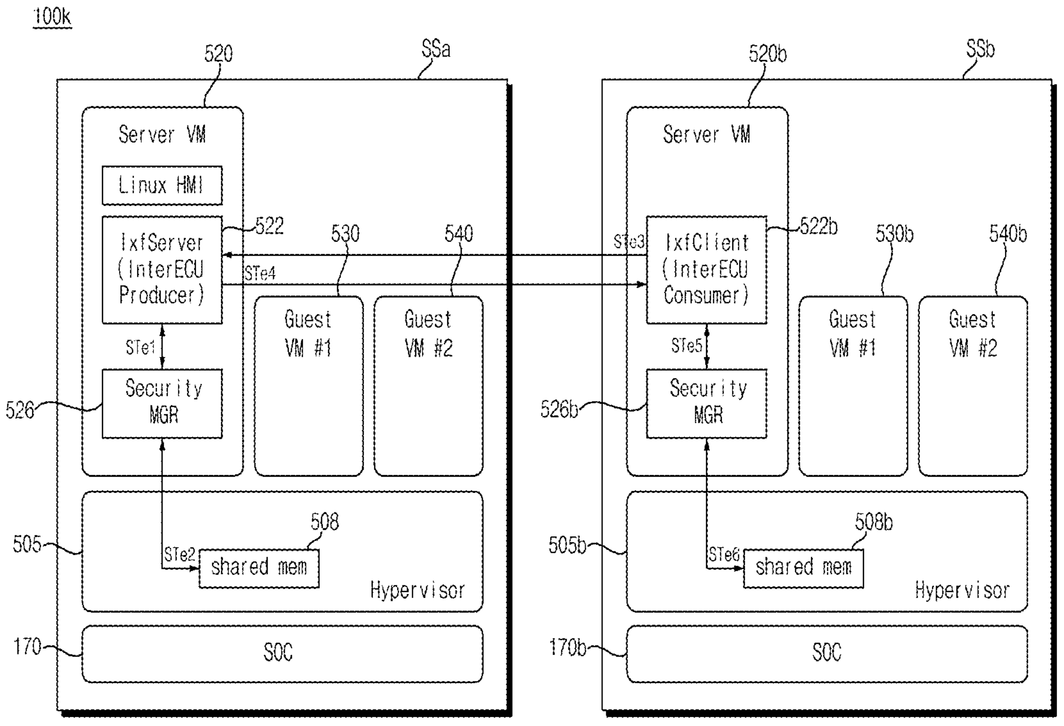
FIGS. 7A and 7B are diagrams illustrating an example of a display apparatus for vehicles.
Figure 7B:
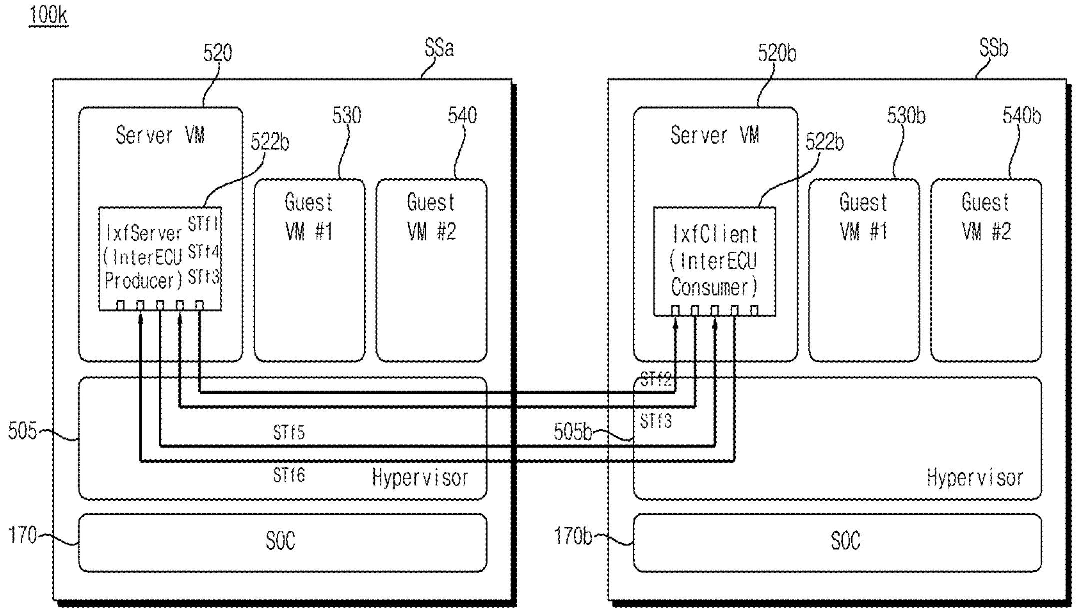

FIGS. 7A and 7B are diagrams illustrating an example of a display apparatus for vehicles.

First, FIG. 7A depicts an example of data movement in a display apparatus 100*k* for vehicles including a plurality of signal processing devices 170 and 170*b*.

Referring to the figure, the signal processing device 170 can execute a first hypervisor 505, and can execute a server virtual machine 520 and first and second guest virtual machines 530 and 540 on the first hypervisor 505.

In some implementations, the second signal processing device 170*b* can execute a second hypervisor 505*b*, and can execute a second server virtual machine 520*b* and third and fourth guest virtual machines 530*b* and 540*b* on the second hypervisor 505*b*.

In some implementations, to transmit data from the signal processing device 170 to the second signal processing device 170*b*, an input and output server interface 522 in the server virtual machine 520 in the signal processing device 170 can transmit a request for allocation of a shared memory 508 to a security manager 526 (STe1).

Subsequently, the security manager 526 can allocate the shared memory 508 using the hypervisor 505 (STe2), and can write shared data in the shared memory 508.

In some implementations, an input and output server interface 522*b* in the second server virtual machine 520*b* in the second signal processing device 170*b* can transmit a request for connection to the input and output server interface 522 after allocation of the shared memory 508 (STe3).

In some implementations, the input and output server interface 522 can transmit information regarding the shared memory 508 including key data to the input and output server interface 522*b* in the second server virtual machine 520*b* in the second signal processing device 170*b* after allocation of the shared memory 508 (STe4). In some implementations, the key data can be private key data.

Subsequently, the input and output server interface 522*b* in the second server virtual machine 520*b* in the second signal processing device 170*b* can transmit a request for allocation of a second shared memory 508*b* to a security manager 526*b* based on the received key data (STe5).

Subsequently, the security manager 526 can allocate the second shared memory 508*b* using the hypervisor 505*b* (STe6), and can write shared data in the second shared memory 508*b* (STe7).

FIG. 7B is a diagram illustrating another example of data movement in the display apparatus 100*k* for vehicles including the plurality of signal processing devices 170 and 170*b*.

Referring to the figure, the system of FIG. 7B is the same in construction to the system of FIG. 7A. Hereinafter, therefore, a description will be given based on data movement.

Referring to the figure, after a booting sequence is completed, the server virtual machine 520 in the signal processing device 170 and the second server virtual machine 520*b* in the second signal processing device 170*b* can execute a benchmark program and store capability scores of the processors 175 and 175*b* (STf1).

Specifically, it is possible to check capability scores of the server virtual machine 520 and the second server virtual machine 520*b*.

Subsequently, the server virtual machine 520 in the signal processing device 170 can attempt to access the second server virtual machine 520*b* in the second signal processing device 170*b* (STf2).

In response to access being accomplished, the second server virtual machine 520*b* in the second signal processing device 170*b* can transmit state information, such as a benchmark score and current usage of CPU/RAM/GPU resources, to the server virtual machine 520 in the signal processing device 170 as a result message (STf3).

Subsequently, the server virtual machine 520 in the signal processing device 170 can check the result message of the second server virtual machine 520*b* in the second signal processing device 170*b*, and determine any one of the signal processing device 170 and the second signal processing device 170*b* to be a master device (STf4).

In some implementations, any one of the signal processing device and the second signal processing device can be determined to be a master device based on an available capability score that is inversely proportional to usage.

In the case in which the server virtual machines 520 and 520*b* are provided in the signal processing device 170 and the second signal processing device 170*b*, respectively, as depicted in FIGS. 7A and 7B, a master signal processing device and a slave signal processing device must be set based on usage thereof, which is confusing. As a result, rapid data movement or rapid data processing is difficult.

Therefore, the present disclosure proposes a scheme in which the server virtual machine is executed in only the signal processing device 170, which is one of the plurality of signal processing devices, and only the guest virtual machine is executed in the other signal processing device 170*b* without execution of the server virtual machine.

In this scheme, the signal processing device 170 in which the server virtual machine becomes a master signal processing device, and the other signal processing device 170*b* is automatically set as a slave signal processing device, whereby a step of setting the master and slave signal processing devices is omitted, and therefore rapid and efficient data movement or rapid and efficient data processing can be achieved. This will be described with reference to FIG. 8 and subsequent figures.

Figure 8:
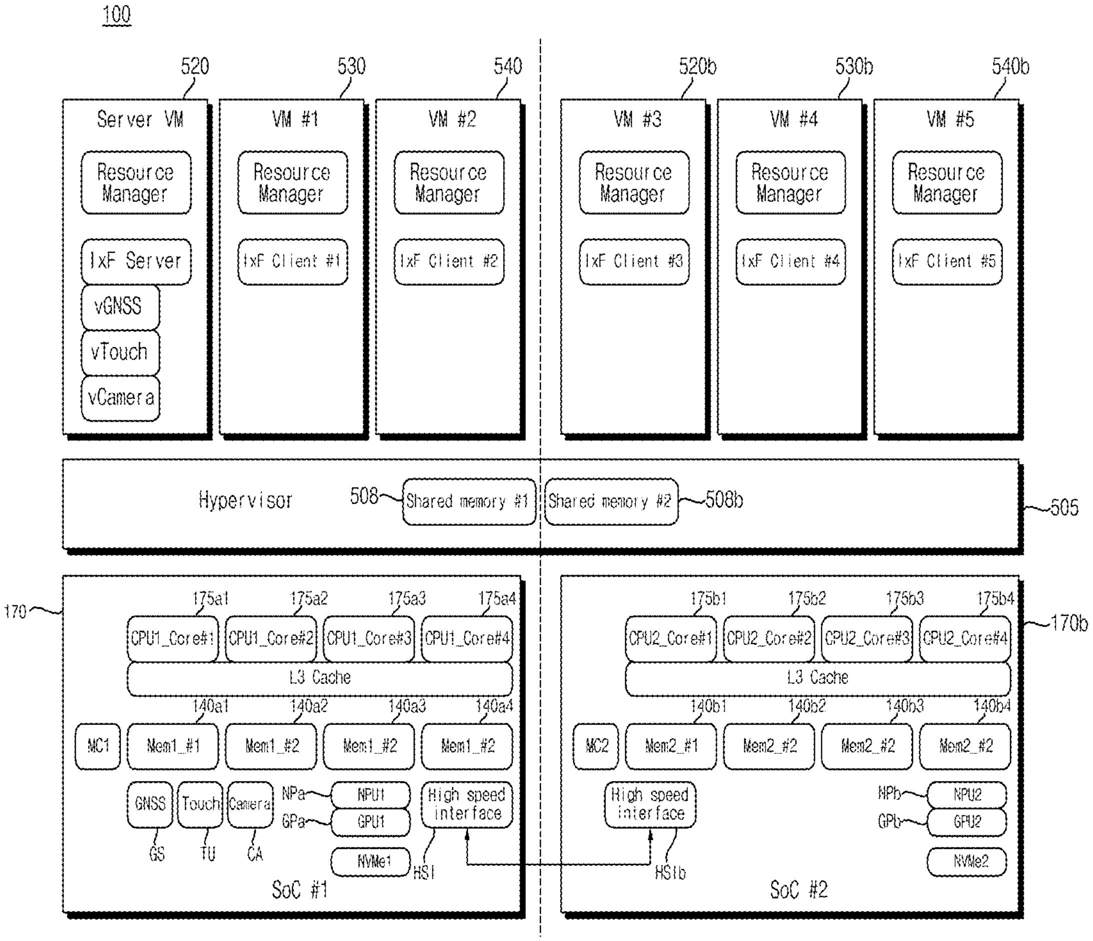
FIG. 8 is a diagram illustrating an example of a display apparatus for vehicles.

FIG. 8 is a diagram illustrating an example of a display apparatus for vehicles.

Referring to the figure, the display apparatus 100 for vehicles can include a signal processing device 170 including a processor 175 configured to perform signal processing and a second signal processing device 170*b* including a second processor 175*b* configured to perform signal processing.

The signal processing device 170 can perform signal processing for at least one of a first display 180*a* or a second display 180*b* in a vehicle 200.

The second signal processing device 170*b* can perform signal processing for at least one of a third display 180*c* or a fourth display 180*d* in the vehicle 200.

In some implementations, the processor 175 in the signal processing device 170 can execute a server virtual machine 520 and at least one guest virtual machine 530 and 540.

As depicted in FIG. 8, the processor 175 in the signal processing device 170 can execute first and second guest virtual machine 530 and 540.

In some implementations, the second processor 175*b* in the second signal processing device 170*b* executes at least one guest virtual machine 520*b*, 530*b*, and 540*b*.

In some implementations, the second processor 175*b* in the second signal processing device 170*b* executes third to fifth guest virtual machines 520*b*, 530*b*, and 540*b*. However, the present disclosure is not limited thereto, and only the third and fourth guest virtual machines 520*b* and 530*b* may be executed.

In some implementations, the processor 175 in the signal processing device 170 in the display apparatus 100 for vehicles can execute the server virtual machine 520 and the at least one guest virtual machine 530 and 540, and the second processor 175*b* in the second signal processing device 170*b* can execute the at least one guest virtual machine 520*b*, 530*b*, and 540*b* without execution of the server virtual machine.

Consequently, the server virtual machine 520 in the signal processing device 170 can efficiently control the at least one guest virtual machine 530 and 540 executed in the signal processing device 170 and the at least one guest virtual machine 520*b*, 530*b*, and 540*b* executed in the second signal processing device 170*b*.

Consequently, transmission efficiency can be increased at the time of data transmission between the plurality of signal processing devices 170 and 170*b* in the vehicle 200. In addition, the plurality of signal processing devices 170 and 170*b* for the plurality of displays in the vehicle 200 can efficiently manage resources.

In some implementations, the server virtual machine 520 can include a resource manager for resource management and an input and output server interface 522 for data communication with the guest virtual machine.

In some implementations, the first to fifth guest virtual machines 530, 540, 520*b*, 530*b*, and 540*b* can include resource managers for resource management and input and output client interfaces 532, 542, 522*b*, 532*b*, and 542*b* for data communication with the server virtual machine 520, respectively.

In some implementations, the signal processing device 170 can include a plurality of processor cores 175*a*1 to 175*a*4, a cache, a plurality of memories 140*a*1 to 140*a*4, a position information driver GS configured to receive or process position information data, a touch driver TU configured to receive or process touch input data, and a camera driver CA configured to receive or process camera image data.

In some implementations, the signal processing device 170 can include a neural network processor NPa for neural network processing, a graphics processor GPa for graphics processing, and a high-speed interface HSI for high-speed data transmission. In some implementations, the high-speed interface HSI can support PCIe, CCIX, or CXL.

In some implementations, the second signal processing device 170*b* can include a plurality of processor cores 175*b*1 to 175*b*4, a cache, and a plurality of memories 140*b*1 to 140*b*4.

In some implementations, the second signal processing device 170*b* can include a neural network processor NPb for neural network processing, a graphics processor GPb for graphics processing, and a high-speed interface HSIb for high-speed data transmission. In some implementations, the high-speed interface HSI can support PCIe, CCIX, or CXL.

In some implementations, the server virtual machine 520 can control the guest virtual machine 530 executed in the processor 175 and the guest virtual machines 520*b*, 530*b*, and 540*b* executed in the second processor 175*b*. Consequently, the plurality of signal processing devices 170 and 170*b* for the plurality of displays in the vehicle 200 can efficiently manage resources.

In some implementations, the server virtual machine 520 can receive and process wheel speed sensor data, position information data, camera image data, or touch input data of the vehicle 200, and can transmit the wheel speed sensor data, the position information data, the camera image data, or the touch input data of the vehicle 200 to the client interfaces 532 and 542 in at least one guest virtual machine 530 and 540 in the processor 175 through the server interface 522*b*. Consequently, transmission efficiency can be increased at the time of data transmission between the plurality of virtual machines 520, 530, and 540 in the signal processing device 170.

In some implementations, the signal processing device 170 and the second signal processing device 170*b* can execute the same hypervisor. Consequently, the plurality of signal processing devices 170 and 170*b* for the plurality of displays in the vehicle 200 can efficiently manage resources.

In some implementations, the server virtual machine 520 can be configured to write the wheel speed sensor data, the position information data, the camera image data, or the touch input data of the vehicle 200 in a first shared memory 508 in the signal processing device 170, and the guest virtual machine 530 in the signal processing device 170 can read the wheel speed sensor data, the position information data, the camera image data, or the touch input data of the vehicle 200 written in the first shared memory 508. Consequently, transmission efficiency can be increased at the time of data transmission between the plurality of virtual machines 520 and 530 in the signal processing device 170.

In some implementations, the server virtual machine 520 can receive and process the wheel speed sensor data, the position information data, the camera image data, or the touch input data of the vehicle 200, and can be configured to transmit the wheel speed sensor data, the position information data, the camera image data, or the touch input data of the vehicle 200 to the at least one guest virtual machine 520*b*, 530*b*, and 540*b* in the second signal processing device 170*b* through the high-speed interfaces HSI and HSIb between the signal processing device 170 and the second signal processing device 170*b*. Consequently, transmission efficiency can be increased at the time of data transmission between the plurality of signal processing devices 170 and 170*b* in the vehicle 200.

In some implementations, the server virtual machine 520 can be configured to write the wheel speed sensor data, the position information data, the camera image data, or the touch input data of the vehicle 200 in a second shared memory 508*b* in the second signal processing device 170*b*, and the at least one guest virtual machine 520*b*, 530*b*, and 540*b* in the second signal processing device 170*b* can read the wheel speed sensor data, the position information data, the camera image data, or the touch input data of the vehicle 200 written in the second shared memory 508*b*. Consequently, transmission efficiency can be increased at the time of data transmission between the plurality of signal processing devices 170 and 170*b* in the vehicle 200.

In some implementations, the server virtual machine 520 can be configured to write the wheel speed sensor data, the position information data, the camera image data, or the touch input data of the vehicle 200 in the first shared memory 508 in the signal processing device 170, and in response to the first shared memory 508 in the signal processing device 170 and the second shared memory 508*b* in the second signal processing device 170*b* being coupled to each other, the guest virtual machine 530 in the signal processing device 170 can read the wheel speed sensor data, the position information data, the camera image data, or the touch input data of the vehicle 200 through the second shared memory 508*b* coupled to the first shared memory 508.

For example, the signal processing device 170 and the second signal processing device 170*b* can transmit or receive data using the coupled shared memory 508. Consequently, transmission efficiency can be increased at the time of data transmission between the plurality of signal processing devices 170 and 170*b* in the vehicle 200.

FIGS. 9 to 15 are diagrams referred to in the description of FIG. 8.

Figure 9:
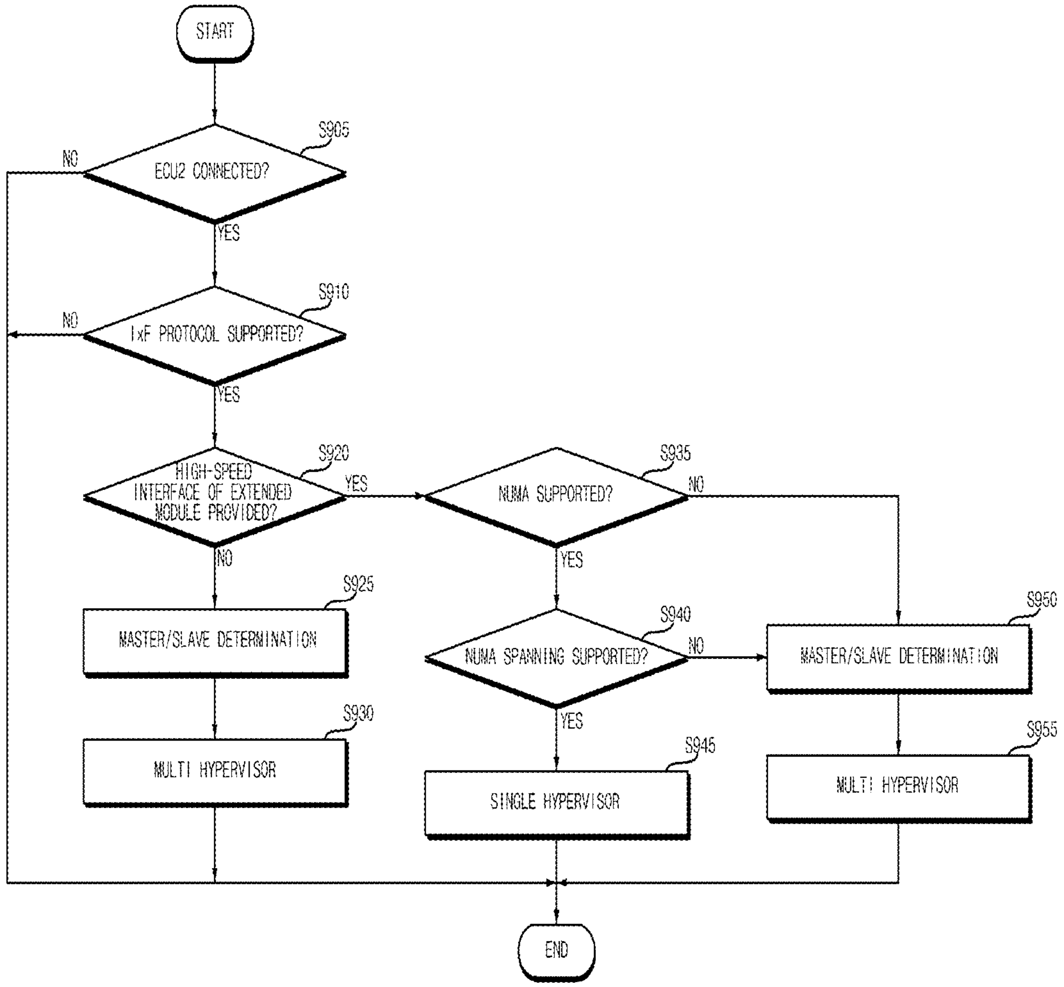

FIG. 9 is a flowchart showing an exemplary operation method of the display apparatus for vehicles.

Referring to the figure, the signal processing device 170 can check whether the second signal processing device 170*b* is electrically connected thereto (S905).

For example, in response to the second signal processing device 170*b* being connected to the signal processing device 170 as an extended module, the signal processing device 170 can determine that the second signal processing device 170*b* is connected to the signal processing device 170 based on a signal input from the second signal processing device 170*b*.

As another example, in response to the second signal processing device 170*b* being connected to the signal processing device 170 as an extended module, the signal processing device 170 can transmit data to the second signal processing device 170*b*, and can determine that the second signal processing device 170*b* is connected to the signal processing device 170 upon receiving a transmission completion message after transmission of the data.

Subsequently, the signal processing device 170 can determine whether the second signal processing device 170*b* supports an interface protocol in the state in which the second signal processing device 170*b* is electrically connected to the signal processing device 170 (S910).

For example, the signal processing device 170 can determine whether the guest virtual machines 520*b*, 530*b*, and 540*b* in the second signal processing device 170*b* include the input and output client interfaces 522*b*, 532*b*, and 542*b*, respectively.

In response to the guest virtual machines 520*b*, 530*b*, and 540*b* in the second signal processing device 170*b* including the input and output client interfaces 522*b*, 532*b*, and 542*b*, respectively, the signal processing device 170 can perform step S920.

Subsequently, the signal processing device 170 can determine whether the high-speed interfaces HSI and HSIb are supported between the signal processing device 170 and the second signal processing device 170*b* (920).

In response to the high-speed interfaces HSI and HSIb being not supported between the signal processing device 170 and the second signal processing device 170*b*, step S925 can be performed. In response to the high-speed interfaces HSI and HSIb being supported between the signal processing device 170 and the second signal processing device 170*b*, step S935 can be performed.

In response to the high-speed interfaces HSI and HSIb being not supported between the signal processing device 170 and the second signal processing device 170*b*, the signal processing device 170 can determine the signal processing device 170 or the second signal processing device 170*b* to be a master signal processing device or a slave signal processing device based on usage thereof, as shown in FIG. 7A or 7B, (S925).

For example, in response to usage of the signal processing device 170 being higher, the signal processing device 170 can be operated as the master signal processing device, and the second signal processing device 170*b* can be operated as the slave signal processing device.

As another example, in response to usage of the second signal processing device 170*b* being higher, the second signal processing device 170*b* can be operated as the master signal processing device, and the signal processing device 170 can be operated as the slave signal processing device.

In some implementations, in response to the signal processing device 170 or the second signal processing device 170*b* being operated as the master signal processing device or the slave signal processing device based on usage thereof, as in step S925, the signal processing device 170 and the second signal processing device 170*b* can execute different hypervisors, as shown in FIG. 7A or 7B, (S930).

As shown in FIG. 7A or 7B, the signal processing device 170 can execute the first hypervisor 505, and the second signal processing device 170*b* can execute the second hypervisor 505*b*.

In some implementations, in response to the high-speed interfaces HSI and HSIb being supported between the signal processing device 170 and the second signal processing device 170*b*, as shown in FIG. 8, the signal processing device 170 can determine whether non-uniform memory access (NUMA) is supported (S935).

Non-uniform memory access (NUMA) can provide independent memories to the processor 175 and the second processor 175*b*.

In response to the high-speed interfaces HSI and HSIb being supported between the signal processing device 170 and the second signal processing device 170*b* and non-uniform memory access (NUMA) is supported, the signal processing device 170 determines whether spanning is supported (S940).

In some implementations, in response to the high-speed interfaces HSI and HSIb being supported between the signal processing device 170 and the second signal processing device 170*b*, non-uniform memory access (NUMA) being supported, and spanning being supported, the signal processing device 170 and the second signal processing device 170*b* can execute the same hypervisor, as shown in FIG. 8, (S945).

Consequently, the plurality of signal processing devices 170 and 170*b* for the plurality of displays in the vehicle 200 can efficiently manage resources.

In some implementations, in response to the high-speed interfaces HSI and HSIb being supported between the signal processing device 170 and the second signal processing device 170*b* but non-uniform memory access (NUMA) not being supported in step S935, step S950 is performed.

For example, in response to the high-speed interfaces HSI and HSIb being supported between the signal processing device 170 and the second signal processing device 170*b* and non-uniform memory access not being supported, the signal processing device 170 can execute the first hypervisor 505, and the second signal processing device 170*b* can execute the second hypervisor 505*b*.

In some implementations, in response to the high-speed interfaces HSI and HSIb being supported between the signal processing device 170 and the second signal processing device 170*b*, and non-uniform memory access (NUMA) being supported, but spanning not being supported in step S940, step S950 is performed.

For example, in response to the high-speed interfaces HSI and HSIb being supported between the signal processing device 170 and the second signal processing device 170*b*, non-uniform memory access (NUMA) being supported, and spanning not being supported, the signal processing device 170 can execute the first hypervisor 505, and the second signal processing device 170*b* can execute the second hypervisor 505*b*.

In step 950, the signal processing device 170 can determine the signal processing device 170 or the second signal processing device 170*b* to be the master signal processing device or the slave signal processing device based on usage thereof, as shown in FIG. 7A or 7B, (S950).

In some implementations, in response to the signal processing device 170 or the second signal processing device 170*b* being operated as the master signal processing device or the slave signal processing device based on usage thereof, as in step S950, the signal processing device 170 and the second signal processing device 170*b* can execute different hypervisors, as shown in FIG. 7A or 7B, (S955).

Figure 10:
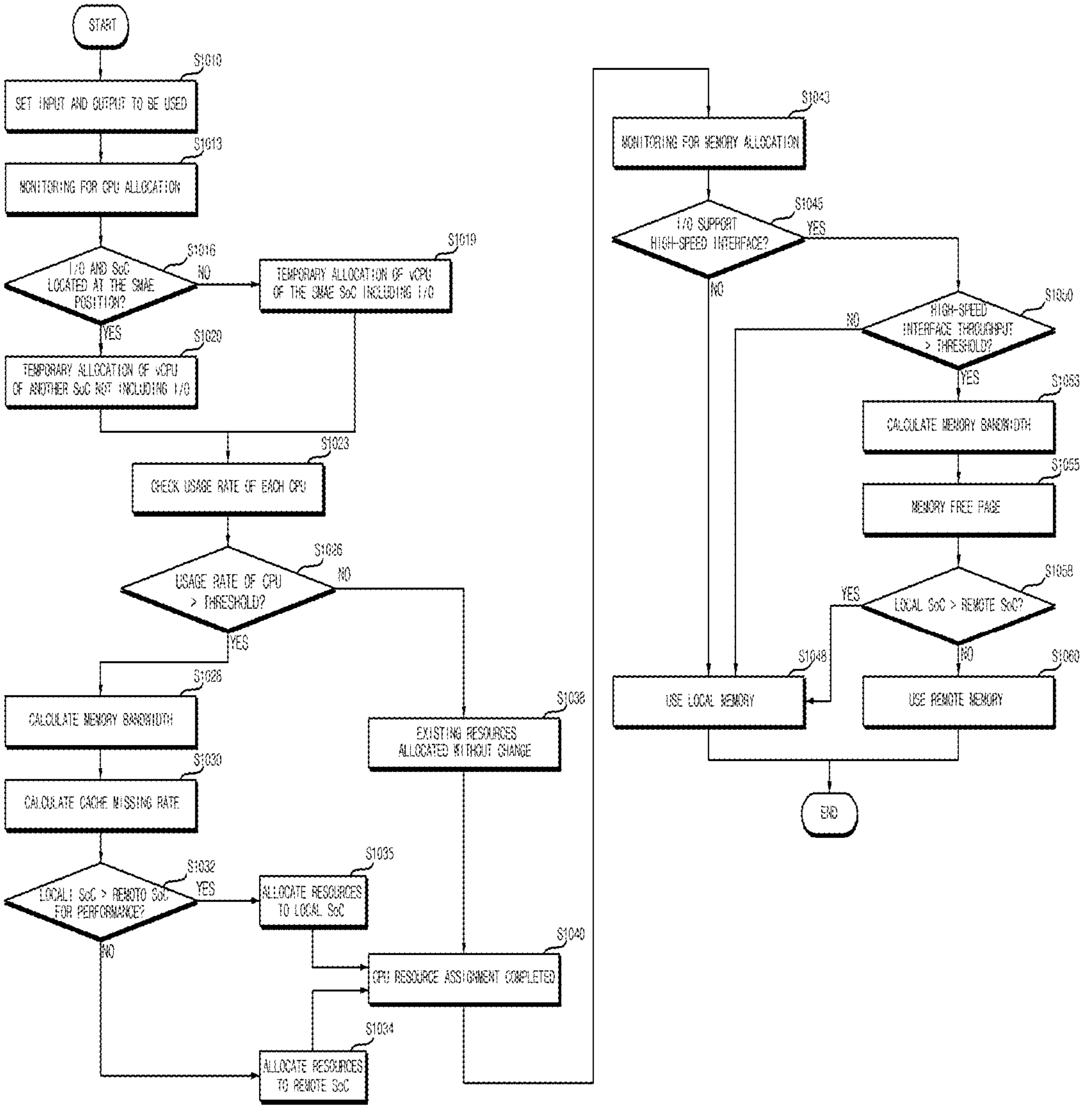

FIG. 10 is a flowchart showing another exemplary operation method of the display apparatus for vehicles.

Referring to the figure, the server virtual machine 520 in the signal processing device 170 can set input and output to be used (S1010).

For example, the server virtual machine 520 in the signal processing device 170 can determine whether any one of the position information driver GS, the touch driver TU, the camera driver CA, the neural network processor NPa, and the graphics processor GPa in the signal processing device 170, and the neural network processor NPb, and the graphics processor GPb in the second signal processing device 170*b* is used.

Subsequently, the server virtual machine 520 in the signal processing device 170 can perform monitoring for allocation of operation of the processor 175 or the second processor 175*b* (S1013).

Subsequently, the server virtual machine 520 in the signal processing device 170 can determine whether the position of the input and output to be used and the position of the signal processing device to be used are the same as each other (S1016).

For example, whether the signal processing device 170, which is located at the same position, is used in the state in which the input and output to be used is the position information driver GS can be determined.

As another example, whether the second signal processing device 170*b*, which is located at a different position, is used in the state in which the input and output to be used is the position information driver GS can be determined.

In response to the positions being the same as each other in step S1016, the server virtual machine 520 in the signal processing device 170 can temporarily allocate the processor in the signal processing device including the output to be used (S1020).

For example, in the state in which the input and output to be used is the position information driver GS, the processor 175 in the signal processing device 170 can be temporarily allocated.

In response to the positions being different from each other in step S1016, the server virtual machine 520 in the signal processing device 170 can temporarily allocate the processor in the signal processing device not including the output to be used (S1019).

For example, in the state in which the input and output to be used is the position information driver GS, the second processor 175*b* in the second signal processing device 170*b* can be temporarily allocated.

Subsequently, after temporary allocation of the processor in step S1019 or step S1020, the server virtual machine 520 in the signal processing device 170 can check a usage rate of each of the processors 175 and 175*b* (S1023), and can determine whether the usage rate of each processor exceeds a threshold (S1026).

In response to the usage rate of each processor exceeding the threshold, step S1028 is performed to divide resources or loads of the processor.

In response to the usage rate of each processor exceeding the threshold, the server virtual machine 520 in the signal processing device 170 can calculate a memory bandwidth (S1028), calculate a cache missing rate (S1030), and determine whether the usage rate of a local processor is higher than the usage rate of a remote processor based on the calculated memory bandwidth and cache missing rate (S1032). If the usage rate of a local processor is higher than the usage rate of a remote processor, the server virtual machine 520 can allocate resources to the local processor (S1035). If the usage rate of a local processor is not higher than the usage rate of a remote processor, the server virtual machine 520 can allocate resources to the remote processor (S1034).

For example, the server virtual machine 520 can change resources to be allocated to the processor 175 or the second processor 175*b* based on the usage rates of the processor 175 and the second processor 175*b*, the memory bandwidth, and the cache missing rate. Consequently, the plurality of signal processing devices 170 and 170*b* for the plurality of displays in the vehicle 200 can efficiently manage resources.

In some implementations, in response to the usage rate of each processor being equal to or less than the threshold in step S1026, existing resources are allocated without change, since resources or loads of each processor are available (S1038).

Subsequently, the server virtual machine 520 in the signal processing device 170 finishes allocation of resources to each of the processors 175 and 175*b* (S1040).

Subsequently, the server virtual machine 520 in the signal processing device 170 can perform monitoring for memory allocation (S1043).

Subsequently, the server virtual machine 520 in the signal processing device 170 can determine whether the input and output requires high-speed interface support (S1045). If the input and output does not require the high-speed interface support, the server virtual machine 520 can be configured to use a local memory (S1048).

In some implementations, in response to the input and output requiring high-speed interface support, the server virtual machine 520 in the signal processing device 170 can determine whether high-speed interface output exceeds a threshold (S1050). If the high-speed interface output exceeds the threshold, the server virtual machine 520 can calculate the memory bandwidth (S1053), and empty the memory (S1055).

Subsequently, the server virtual machine 520 in the signal processing device 170 can determine whether the usage rate of the local processor is higher than the usage rate of the remote processor (S1058). If the usage rate of the local processor is higher than the usage rate of the remote processor, the server virtual machine 520 can use the local memory (S1048). If the usage rate of the local processor is not higher than the usage rate of the remote processor, the server virtual machine 520 can use the remote memory (S1060).

Consequently, resources between the processor 175 in the signal processing device 170 and the second processor 175*b* in the second signal processing device 170*b* can be evenly allocated if possible.

Furthermore, resources between the memories 140*a*1 to 140*a*4 in the signal processing device 170 and the memories 140*b*1 to 140*b*4 in the second signal processing device 170*b* can be evenly allocated if possible.

In some implementations, the processor 175 or the second processor 175*b* can separately control a local virtual machine and a remote virtual machine depending on the position of input and output of data. Consequently, the plurality of signal processing devices 170 and 170*b* for the plurality of displays in the vehicle 200 can efficiently manage resources.

FIG. 11 is a diagram illustrating a processor and a memory allocated for each input and output according to the flowchart of FIG. 10.

For example, in response to an input and output resource being the position information driver GS configured to receive or process position information data, the server virtual machine 520 in the signal processing device 170 can allocate the first processor core 175*a*1, among the plurality of processor cores 175*a*1 to 175*a*4, and the first memory 140*a*1, among the plurality of memories 140*a*1 to 140*a*4, and can be configured to use the first processor core 175*a*1 and the first memory 140*a*1 in the first guest virtual machine 530.

As another example, in response to the input and output resource being the touch driver TU configured to receive or process touch input data, the server virtual machine 520 in the signal processing device 170 can allocate the second processor core 175*a*2, among the plurality of processor cores 175*a*1 to 175*a*4, and the second memory 140*a*2, among the plurality of memories 140*a*1 to 140*a*4, and can be configured to use the second processor core 175*a*2 and the second memory 140*a*2 in the second guest virtual machine 540.

As another example, in response to the input and output resource being the neural network processor NPb in the second signal processing device 170*b*, the server virtual machine 520 in the signal processing device 170 can allocate the fifth processor core 175*b*1, among the plurality of processor cores 175*b*1 to 175*b*4, and the fifth memory 140*b*1, among the plurality of memories 140*b*1 to 140*b*4, and can be configured to use the fifth processor core 175*b*1 and the fifth memory 140*b*1 in the third guest virtual machine 530*b*.

As a further example, in response to the input and output resource being the graphics processor GPb in the second signal processing device 170*b*, the server virtual machine 520 in the signal processing device 170 can allocate the sixth processor core 175*b*2, among the plurality of processor cores 175*b*1 to 175*b*4, and the third memory 140*a*3, among the plurality of memories 140*a*1 to 140*a*4, and can be configured to use the sixth processor core 175*b*2 and the third memory 140*a*3 in the fourth guest virtual machine 540*b*.

In particular, in response to the input and output resource being the graphics processor GPb in the second signal processing device 170*b*, the processor core in the second signal processing device 170*b* can be allocated, and the memory in the signal processing device 170 can be allocated. Consequently, resources in the processor and the memory can be efficiently managed.

In some implementations, since high-speed interface support is possible between the signal processing device 170 and the second signal processing device 170*b*, such cross resource management can be achieved.

Figure 12:
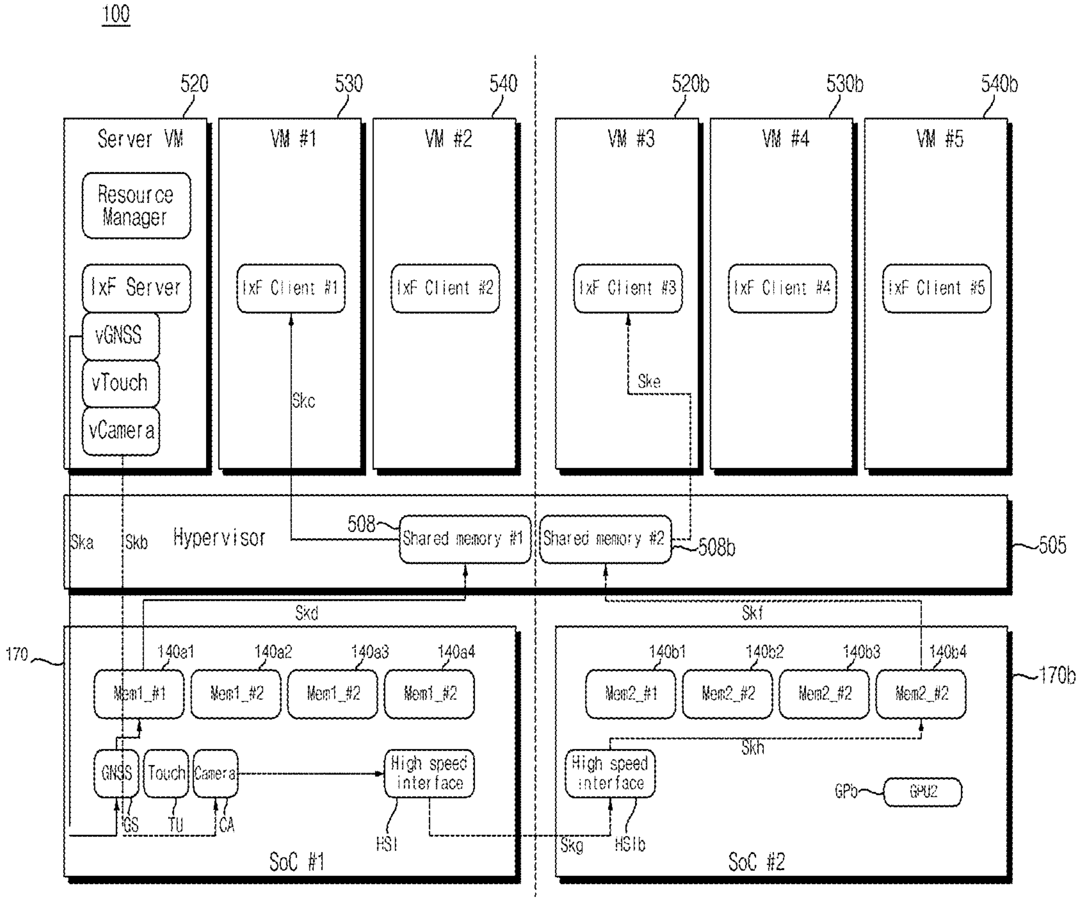

FIG. 12 is a diagram illustrating an example of data transmission in the display apparatus for vehicles of FIG. 8.

Referring to the figure, in response to the high-speed interfaces HSI and HSIb being supported between the signal processing device 170 and the second signal processing device 170*b*, non-uniform memory access (NUMA) being supported, and spanning being supported, the signal processing device 170 and the second signal processing device 170*b* can execute the same hypervisor, in the same manner as shown in FIG. 8.

In some implementations, in response to resources in the signal processing device 170 in which the server virtual machine 520 is executed being transmitted to the guest virtual machine therein, data can be transmitted using the shared memory 508.

For example, in response to position information data from the position information driver GS being received, the position information interface in the input and output server interface 522 can be configured to write the position information data in the shared memory 508 (Skd), and the input and output client interface 532 in the first guest virtual machine 530 can read the position information data written in the shared memory 508 (Skc).

Similarly, in response to touch input data from the touch driver TU or camera image data from the camera driver CA being received (Ska), the touch input interface or the camera interface in the input and output server interface 522 can be configured to write the touch input data or the camera image data in the shared memory 508, and the input and output client interface 532 in the first guest virtual machine 530 can read the touch input data or the camera image data written in the shared memory 508.

In some implementations, in response to resources in the signal processing device 170 in which the server virtual machine 520 is executed being transmitted to the guest virtual machine in the second signal processing device 170*b*, data can be transmitted using the high-speed interface and the second shared memory 508*b*.

For example, in response to camera image data from the camera driver CA being received (SKb), the camera interface in the input and output server interface 522 can transmit the camera image data to the second signal processing device 170*b* through the high-speed interfaces HSI and HSIb (Skg), and can be configured to write the camera image data in the second shared memory 508*b* (Skf).

Consequently, the input and output client interface 522*b* in the third guest virtual machine 530*b* can read the touch input data or the camera image data written in the second shared memory 508*b* (Ske).

Figure 13A:
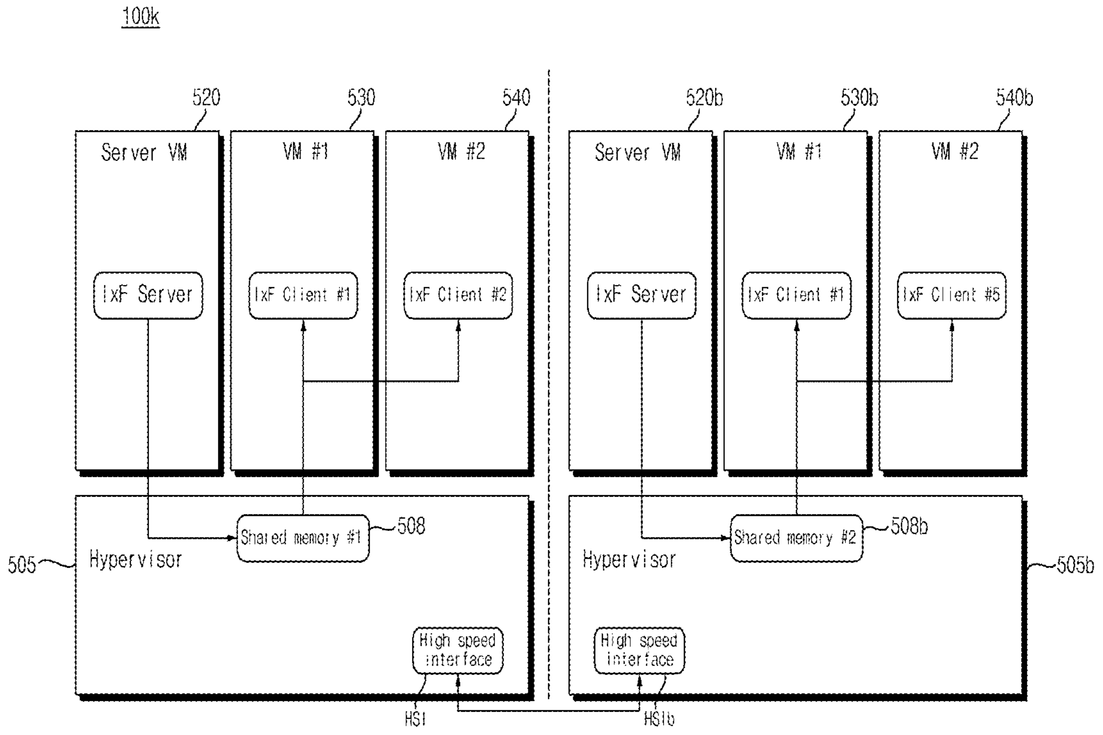

FIG. 13A is a diagram illustrating another example of data transmission in the display apparatus for vehicles of FIG. 7A or 7B.

Referring to the figure, in response to the high-speed interfaces HSI and HSIb being supported between the signal processing device 170 and the second signal processing device 170*b* in the display apparatus 100*k* for vehicles, the signal processing device 170 or the second signal processing device 170*b* can be operated as the master signal processing device or the slave signal processing device based on usage thereof.

In some implementations, the server virtual machine 520 can transmit data to the first guest virtual machine 530 or the second guest virtual machine 540 using the shared memory 508.

In some implementations, the server virtual machine 520 can be configured to transmit data between the signal processing device 170 and the second signal processing device 170*b* through the high-speed interfaces HSI and HSIb.

In some implementations, the second signal processing device 170*b* can execute the second server virtual machine 520*b* and the plurality of guest virtual machines 530*b* and 540*b*, and the second server virtual machine 520*b* can transmit data to the third guest virtual machine 530*b* or the fourth guest virtual machine 540*b* using the second shared memory 508*b*.

In response to the server virtual machines 520 and 520*b* in the signal processing devices 170 and 170*b* being executed, as shown in FIG. 13A, collision may occur between the server virtual machines 520 and 520*b*, whereby transmission efficiency may be lowered at the time of data transmission.

Figure 13B:
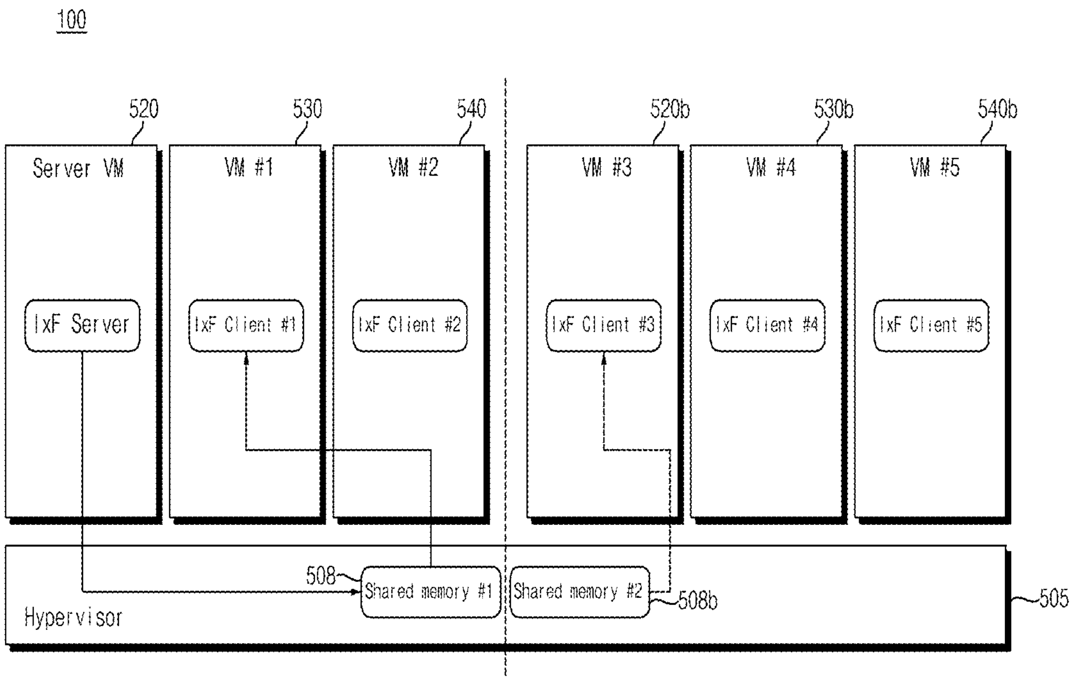

FIG. 13B is a diagram illustrating another example of data transmission in the display apparatus for vehicles of FIG. 8.

Referring to the figure, the server virtual machine 520 in the signal processing device 170 in the display apparatus 100 for vehicles can transmit data to the first guest virtual machine 530 or the second guest virtual machine 540 using the shared memory 508. Consequently, transmission efficiency can be increased at the time of data transmission between the plurality of virtual machines in the vehicle 200.

In some implementations, the server virtual machine 520 in the signal processing device 170 can transmit data to the third guest virtual machine 520*b*, the fourth guest virtual machine 530*b*, or the fifth guest virtual machine 540*b* using the high-speed interfaces HSI and HSIb and the second shared memory 508*b*. Consequently, transmission efficiency can be increased at the time of data transmission between the plurality of signal processing devices 170 and 170*b* in the vehicle 200.

Figure 14:
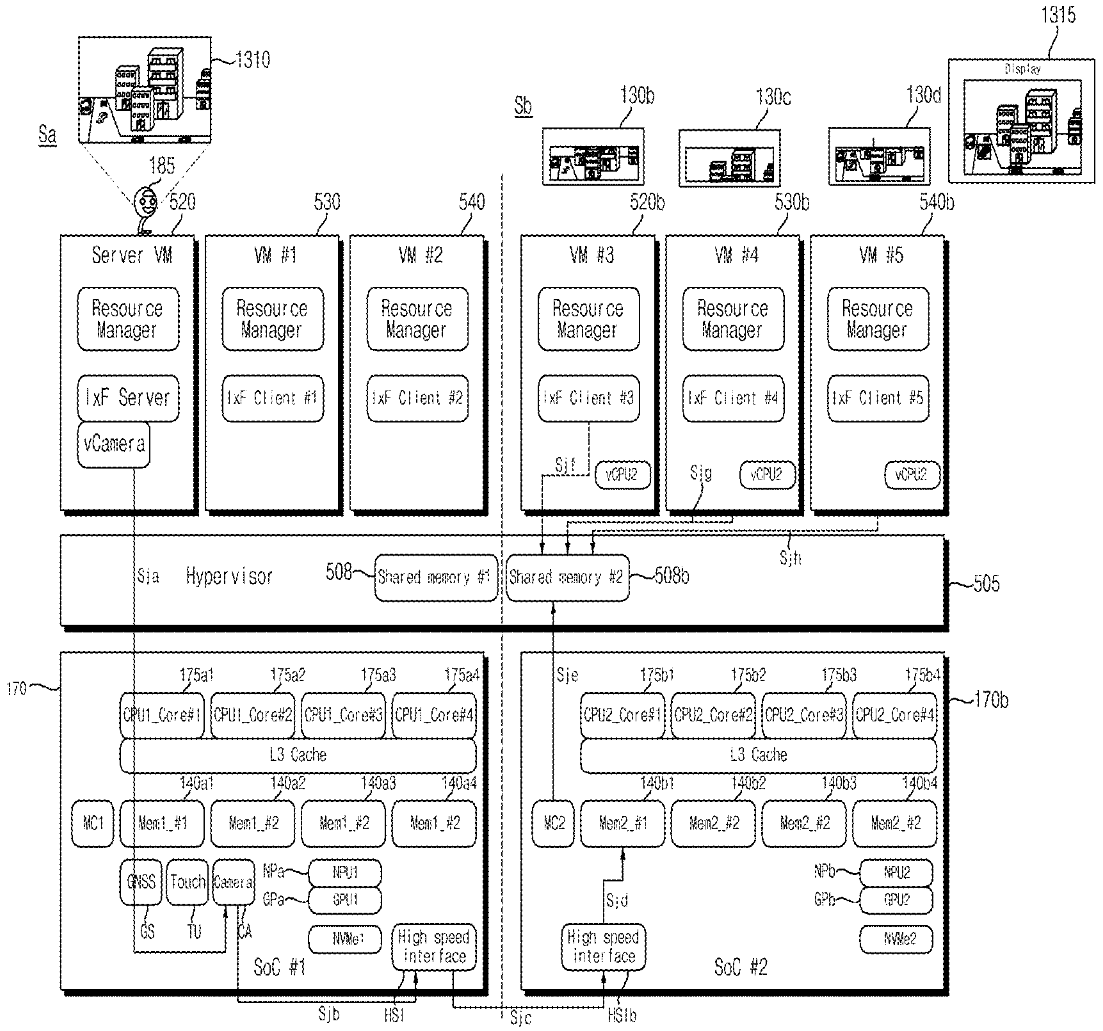

FIG. 14 is a diagram illustrating an example of camera data transmission in the display apparatus for vehicles of FIG. 8.

Referring to the figure, the server virtual machine 520 can be configured to transmit camera data 1310 from the camera 195 to the second signal processing device 170*b* using the high-speed interfaces HSI and HSIb so as to be processed only by the second signal processing device 170*b* (Sjc), and can be configured to write the camera data in the second shared memory 508*b* (Sje).

Subsequently, the server virtual machine 520 can be configured to write some 130*b* of the camera data 1310 in a first buffer of the second shared memory 508*b*, some other 130*c* of the camera data 1310 can be written in a second buffer of the second shared memory 508*b*, and some other 130*d* of the camera data 1310 can be written in a third buffer of the second shared memory 508*b*.

The third to fifth guest virtual machines 520*b*, 530*b*, and 540*b* in the second signal processing device 170*b* can read some 130*b*, some other 130*c*, and some other 130*d* of the camera data 1310 from the second shared memory 508*b*, respectively, and can process the data.

For example, the third to fifth guest virtual machines 520*b*, 530*b*, and 540*b* in the second signal processing device 170*b* can detect objects from the received image data 130*b*, 130*c*, and 130*d*, respectively, and can be configured to write the image data from which the objects have been detected in the second shared memory 508*b*. Consequently, loads can be divided at the time of data processing.

The server virtual machine 520 can read the data written in the second shared memory 508*b* again, can be configured to transmit the data to the shared memory 508, and receive the image data from which the objects have been detected through the shared memory 508.

In some implementations, the server virtual machine 520 can receive the image data from which the objects have been detected, and can be configured to display a processed image 1315 on the display 180*a*, 180*b* or 180*c*.

In some implementations, the server virtual machine 520 can be configured to process the camera data 1310 from the camera 195 by the signal processing device 170 as well as the second signal processing device 170*b*.

For example, the server virtual machine 520 can be configured to write the camera data 1310 in at least one of the first shared memory 508 in the signal processing device 170 or the second shared memory 508*b* in the second signal processing device 170*b*, the guest virtual machine 530 in the first processor 175 can receive and process some of the camera data written in the first shaped memory 508 and can write the processed data in the first shared memory 508, and at least one guest virtual machine 520*b*, 530*b*, and 540*b* in the second signal processing device 170*b* can receive and process some other of the camera data written in the second shared memory 508*b* and can write the processed data in the second shared memory 508*b*. Consequently, loads can be divided at the time of camera data processing.

Figure 15:
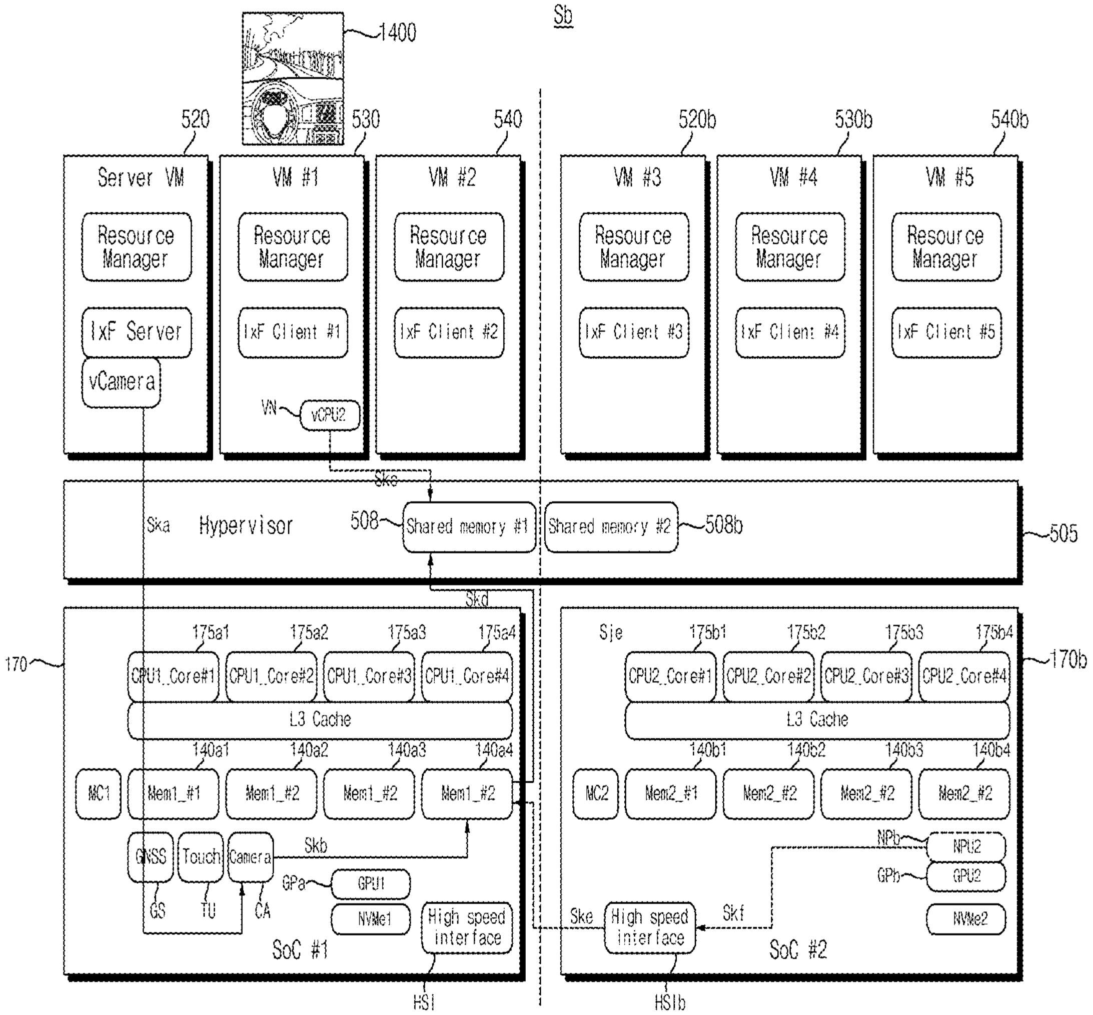

FIG. 15 is a diagram illustrating another example of camera data transmission in the display apparatus for vehicles of FIG. 8.

Referring to the figure, the server virtual machine 520 can be configured to write that camera data in the first shared memory 508 in the signal processing device 170 (Skd), and the guest virtual machine 530 in the first processor 175 can receive and process the camera data written in the first shared memory 508 and can write the processed data in the first shared memory 508 (Ske).

In some implementations, the second signal processing device 170*b* can receive the camera data written in the first shared memory 508 through the high-speed interfaces HSI and HSIb, and the second processor 175*b* can perform augmented reality processing on the camera data through neural network processing and can be configured to write the augmented reality processed data in the first shared memory 508 or the second shared memory 508*b*. Consequently, loads can be divided at the time of camera data processing.

In some implementations, the server virtual machine 520 can combine the augmented reality processed data and the processed camera data with each other, and can be configured to display a composite image related to the combined data on the display 180*a*, 180*b*, or 180*c*. Consequently, an augmented reality processed image 1400 can be rapidly displayed.

What is claimed is:

1. A display apparatus for a vehicle, the display apparatus comprising:
 - a first display and a second display configured to be located in the vehicle;
 - a first signal processing device comprising a first processor configured to perform signal processing for at least one of the first display or the second display; and
 - a second signal processing device comprising a second processor configured to perform signal processing, wherein:
 - the first processor is configured to execute a server virtual machine and a guest virtual machine, and
 - the second processor is configured to execute at least one guest virtual machine, and
 - wherein the server virtual machine is configured to:
 - receive and process wheel speed sensor data, position information data, camera image data, or touch input data of the vehicle, and
 - transmit the wheel speed sensor data, the position information data, the camera image data, or the touch input data of the vehicle to a client interface in the guest virtual machine executed in the first processor through a server interface.

2. The display apparatus of claim 1, further comprising:
 - a third display configured to be located in the vehicle,
 - wherein the second processor is configured to perform signal processing for the third display.

3. The display apparatus of claim 1, wherein the second processor is configured to, based on the server virtual machine being executed by the first processor, execute the at least one guest virtual machine.

4. The display apparatus of claim 1, wherein the first signal processing device and the second signal processing device are configured to transmit or receive data using a coupled shared memory.

5. The display apparatus of claim 1, wherein the server virtual machine is configured to control the guest virtual machine executed in the first processor and the guest virtual machine executed in the second processor.

6. The display apparatus of claim 1, wherein, based on high-speed interface being supported between the first signal processing device and the second signal processing device and non-uniform memory access not being supported, (i) the first signal processing device is configured to execute a first hypervisor and (ii) the second signal processing device is configured to execute a second hypervisor.

7. The display apparatus of claim 1, wherein, based on (i) high-speed interface being supported between the first signal processing device and the second signal processing device, (ii) non-uniform memory access being supported, and (iii) spanning being supported, the first signal processing device and the second signal processing device are configured to execute a same hypervisor.

8. The display apparatus of claim 1, wherein, based on high-speed interface being supported between the first signal processing device and the second signal processing device, non-uniform memory access being supported, and spanning not being supported, (i) the first signal processing device is configured to execute a first hypervisor and (ii) the second signal processing device is configured to execute a second hypervisor.

9. The display apparatus of claim 1, wherein the server virtual machine is configured to control resource management for the guest virtual machine executed in the first processor and the guest virtual machine executed in the second processor.

10. The display apparatus of claim 1, wherein the server virtual machine is configured to change resource allocation for the first processor or the second processor based on usage rates of the first processor and the second processor, a memory bandwidth, and a cache missing rate.

11. The display apparatus of claim 1, wherein the first processor or the second processor is configured to control a local virtual machine and a remote virtual machine based on a position of input and output of data.

12. The display apparatus of claim 1, wherein:

the server virtual machine is configured to write wheel speed sensor data, position information data, camera image data, or touch input data of the vehicle in a first shared memory in the first signal processing device, and the guest virtual machine executed in the first signal processing device is configured to read the wheel speed sensor data, the position information data, the camera image data, or the touch input data of the vehicle written in the first shared memory.

13. The display apparatus of claim 1, wherein the server virtual machine is configured to:

receive and process wheel speed sensor data, position information data, camera image data, or touch input data of the vehicle, and transmit the wheel speed sensor data, the position information data, the camera image data, or the touch input data of the vehicle to the guest virtual machine executed in the second signal processing device through high-speed interface between the first signal processing device and the second signal processing device.

* * * * *